(12) United States Patent
Spagnola

(10) Patent No.: US 9,406,239 B2
(45) Date of Patent: Aug. 2, 2016

(54) VECTOR-BASED LEARNING PATH

(71) Applicant: Pearson Education, Inc., Upper Saddle River, NJ (US)

(72) Inventor: Perry M. Spagnola, Phoenix, AZ (US)

(73) Assignee: PEARSON EDUCATION, INC., Upper Saddle River, NJ (US)

(*) Notice: Subject to any disclaimer, the term of this patent is extended or adjusted under 35 U.S.C. 154(b) by 0 days.

(21) Appl. No.: 14/137,890

(22) Filed: Dec. 20, 2013

(65) Prior Publication Data

US 2015/0179078 A1 Jun. 25, 2015

(51) Int. Cl.
G09B 25/00 (2006.01)
G09B 5/00 (2006.01)
G09B 7/08 (2006.01)

(52) U.S. Cl.
CPC ... *G09B 5/00* (2013.01); *G09B 7/08* (2013.01)

(58) Field of Classification Search
CPC .............. G09B 5/00; G09B 5/02; G09B 5/04; G09B 5/06
USPC ........................... 434/322, 323, 350, 362, 365
See application file for complete search history.

(56) References Cited

U.S. PATENT DOCUMENTS

| | | | |
|---|---|---|---|
| 6,484,010 B1 | 11/2002 | Sheehan | |
| 6,808,392 B1 | 10/2004 | Walton | |
| 8,033,831 B2 | 10/2011 | Julia et al. | |
| 8,052,426 B2 | 11/2011 | Snyder et al. | |
| 8,753,200 B1 | 6/2014 | Supanc et al. | |
| 2004/0009461 A1* | 1/2004 | Snyder et al. | 434/350 |
| 2005/0060221 A1* | 3/2005 | Kolar et al. | 705/10 |
| 2007/0292826 A1 | 12/2007 | Goddy et al. | |
| 2008/0040370 A1 | 2/2008 | Bosworth et al. | |
| 2009/0075709 A1 | 3/2009 | Park | |
| 2009/0197237 A1* | 8/2009 | Couch et al. | 434/362 |
| 2010/0143873 A1* | 6/2010 | Keim et al. | 434/156 |
| 2011/0039242 A1 | 2/2011 | Packard et al. | |
| 2011/0177480 A1 | 7/2011 | Menon et al. | |
| 2011/0195389 A1* | 8/2011 | DeYoung et al. | 434/350 |
| 2012/0040326 A1* | 2/2012 | Larson-Rutter et al. | 434/350 |
| 2014/0024009 A1 | 1/2014 | Nealon et al. | |

OTHER PUBLICATIONS

Quantiles.com; The Quantile Framework for Mathematics; Feb. 18, 2006. [online], retrieved on Feb. 9, 2014]. Retrieved from the Wayback Machine, archive.org https://web.archive.org/web/20060218165157/http://www.quantiles.com/EntrancePageFlash.html?1.
First Action Interview Pilot Program Pre-Interview Communication mailed on Sep. 23, 2014 for U.S. Appl. No. 14/154,050, 4 pages.
Non-Final Office Action mailed on Feb. 13, 2014 for U.S. Appl. No. 14/089,432, 10 pages.
Non-Final Office Action mailed on Jul. 22, 2014 for U.S. Appl. No. 14/089,432, 5 pages.

* cited by examiner

*Primary Examiner* — Peter Egloff
(74) *Attorney, Agent, or Firm* — Kilpatrick Townsend & Stockton LLP

(57) ABSTRACT

A method/apparatus/system for learning path recommendation based on student and learning vector context is disclosed. The incident learning object and the target learning object are identified. Learning paths between the incident learning object and the target learning object are identified, which learning paths each include a plurality of learning objects and learning vectors. A magnitude is calculated for the learning paths, which magnitude is based on the sum of the magnitudes of the learning vectors in each learning path. The magnitudes of the learning paths are compared, and one of the learning paths is selected based on the comparison of the learning paths and provided to a student.

13 Claims, 11 Drawing Sheets

VECTOR-BASED LEARNING PATH

BACKGROUND OF THE INVENTION

This disclosure relates in general to on-line or computerized learning including, but without limitation to learning or instruction with a Learning Management System (LMS) and/or Online Homework System (OHS) and, but not by way of limitation, to assisting students using the LMS and/or OHS.

Numerous resources can be used in facilitating student achievement of an education goal. These resources can include, but not by way of limitation, instructional resources such as lectures, demonstrations, or example problems, practice resources such as practice problems or assignments, evaluation resources including, for example, a quiz, a test, or the like, and remediation resources. These resources are frequently provided according to a curriculum or syllabus. In particular, in the class-room environment, a syllabus identifies the resources that will be provided to a student and outlines the order in which resources will be provided to a student.

BRIEF SUMMARY OF THE INVENTION

In one embodiment, the present disclosure provides a method of recommending a learning path. The method can include identifying an incident learning object by a user input, which user can be a teacher or a student, or by a student context, which student context can include the student's learning history and metadata identifying a student learning capability. The incident learning object can be an initial position of a student within a learning object network. The learning object network can be a plurality of learning objects, which learning objects can each be an aggregation of learning content that can be associated with an assessment, and the learning object network can be a plurality of learning vectors, each of which plurality of learning vectors can connect two of the plurality of learning objects and identify a prerequisite relationship between the connected two of the plurality of learning objects. Each of the plurality of learning vectors can include a direction identifying the prerequisite relationship and a magnitude. The method can include identifying a target learning object, which target learning object can be a learning object separated from the incident learning object by a plurality of learning vectors, identifying a first path from the incident learning object to the target learning object, which first path can include a plurality of learning objects and a plurality of learning vectors connecting the incident learning object to the target learning object, and calculating the magnitude of the first path from the incident learning object to the target learning object. The method can include identifying a second path from the incident learning object to the target learning object, which second path can include a plurality of learning objects and learning vectors connecting the incident learning object to the target learning object, and which second path can include at least one learning object that is not in the first path, calculating the magnitude of the second path from the incident learning object to the target learning object, comparing the magnitude of the first path to the magnitude of the second path, and providing one of the first and second paths.

In some embodiments of the method, the calculating of the magnitude of the first path from the incident learning object to the target learning object can include retrieving the magnitudes of the plurality of learning vectors in the first path, and calculating a combined magnitude of the first path. In some embodiments, calculating the magnitude of the second path from the incident learning object to the target learning object can include retrieving the magnitudes of the plurality of learning vectors in the second path and calculating a combined magnitude of the second path.

In some embodiments of the method, retrieving the magnitudes of the plurality of learning vectors in the first path can include identifying a characteristic of the student, which student characteristic can be identified via a user input or via the student context, retrieving a learning vector context, which learning vector context identifies magnitude data corresponding to aspects of the student context, and identifying magnitude data corresponding to the identified characteristic of the student. In some embodiments, the student characteristic can include one of: a learning style; a student's past performance; and a student preference.

In some embodiments of the method, calculating the combined magnitude of the first path can include calculating the sum of the magnitudes of the plurality of learning vectors in one or both of the first and second paths. In some embodiments, comparing the magnitude of the first path to the magnitude of the second path can include retrieving the magnitude of the first path, retrieving the magnitude of the second path, comparing the value of the magnitude of the first path to the magnitude of the second path, adding a first binary-value to the learning path having a smaller combined magnitude and a second binary-value to the learning path having a larger combined magnitude, retrieving the learning path associated with the first value, and providing the learning path associated with the first value.

In some embodiments, the magnitude of the first path can include a measure of the estimated duration of the traversal of the first path and the magnitude of the second path can include a measure of the estimated duration of the traversal of the second path. In some embodiments, the method can further include calculating a first strength of the first learning path, which first strength identifies the degree to which students have successfully traversed the first learning path, calculating a second strength of the second learning path, which second strength identifies the degree to which students have successfully traversed the second learning path, comparing the first strength to the second strength, and selecting one of the first and second paths based on the comparison of the first and second strengths and the magnitudes of the first and second learning paths.

In some embodiments, the present disclosure relates to a system for recommending a learning path. The system can include memory including information identifying a student context that includes the student's learning history, and metadata identifying a student learning capability and a number of learning objects, each of which learning objects can be an aggregation of learning content that is associated with an assessment, information identifying a number of learning vectors, each of which learning vectors can connect two of the learning objects and identify a prerequisite relationship between the connected two of the learning objects, and each of which learning vectors can include a direction identifying the prerequisite relationship and a magnitude. The system can include a processor that can identify an incident learning object, which incident learning object can be an initial position of a student within a learning object network that can include a plurality of the learning objects and a plurality of the learning vectors. In some embodiments, the incident learning object can be identified by one of a user input identifying the incident learning object, which user can be one of a teacher and a student, and the student context. The processor can identify a target learning object, which target learning object can be a learning object separated from the incident learning object by a plurality of learning vectors, identify a first path from the incident learning object to the target learning object, which first path can be a plurality of learning objects and a plurality of learning vectors connecting the incident learning object to the target learning object, and calculate the magnitude of the first path from the incident learning object to the target learning object. The processor can identify a second path from the incident learning object to the target learning object, which second path can be a plurality of learning objects and learning vectors connecting the incident learning object to the target learning object and which second path can include at least one learning object that is not in the first path, calculate the magnitude of the second path from the incident learning object to the target learning object, compare the magnitude of the first path to the magnitude of the second path, and provide one of the first and second paths.

In some embodiments, calculating the magnitude of the first path from the incident learning object to the target learning object can include retrieving the magnitudes of the plurality of learning vectors in the first path and calculating a combined magnitude of the first path, and in some embodiments, calculating the magnitude of the second path from the incident learning object to the target learning object can include retrieving the magnitudes of the plurality of learning vectors in the second path and calculating a combined magnitude of the second path. In some embodiments, retrieving the magnitudes of the plurality of learning vectors in the first path can include identifying a characteristic of the student, which student characteristic can be identified via a user input or via the student context, retrieving a learning vector context that can identify magnitude data corresponding to aspects of the student context, and identifying magnitude data corresponding to the identified characteristic of the student. In some embodiments, calculating the combined magnitude of the first path includes calculating the sum of the magnitudes of the plurality of learning vectors in the first path. In some embodiments, comparing the magnitude of the first path to the magnitude of the second path can include retrieving the magnitude of the first path, retrieving the magnitude of the second path, comparing the value of the magnitude of the first path to the magnitude of the second path, adding a first binary-value to the learning path having a smaller combined magnitude and a second binary-value to the learning path having a larger combined magnitude, retrieving the learning path associated with the first value, and providing the learning path associated with the first value.

In some embodiments of the system, the magnitude of the first path can include a measure of the estimated duration of the traversal of the first path and the magnitude of the second path can include a measure of the estimated duration of the traversal of the second path. In some embodiments, the processor can calculate a first strength of the first learning path, which first strength can identify the degree to which students have successfully traversed the first learning path, calculate a second strength of the second learning path, which second strength can identify the degree to which students have successfully traversed the second learning path, compare the first strength to the second strength, and select one of the first and second paths based on the comparison of the first and second strengths and the magnitudes of the first and second learning paths.

Some embodiments of the present disclosure relate to a method of maintaining a student context. The method can include receiving an indicator of a traversed learning vector that can link an incident learning object to a terminal learning object and indicate a prerequisite relationship between the incident learning object and the terminal learning object. In some embodiments, the incident learning object and the terminal learning object each can include an aggregation of learning content, which aggregations of learning content are each associated with an assessment. The method can include receiving a performance indicator, which performance indicator can identify the degree of success in traversing the learning vector, determining a value according to a Boolean function, which value can be a first value if the input indicative of the traversal of the learning vector indicates a desired outcome and which value can be a second value if the input indicative of the traversal of the learning vector indicates an undesired outcome, retrieving a student context that can include the student's learning history and metadata identifying a student learning capability, adjusting an aspect of the student context according to the value, which adjustment of the aspect of the student context can include strengthening the aspect of the student context if the value is the first value and which adjustment of the aspect of the student context can include weakening the aspect of the student context if the value is the second value.

In some embodiments, the aspect of the student context can include the metadata identifying a student learning capability; which student learning capability can identify a student learning style. In some embodiments, the method can further include retrieving a learning vector context for the traversed learning vector, which learning vector context identifies learning styles having high success rates in traversing the learning vector. In some embodiments, adjusting the aspect of the student context can include adjusting the strength of the relationship between the learning styles identified in the learning vector context as having high success rates in traversing the learning vector and the student.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
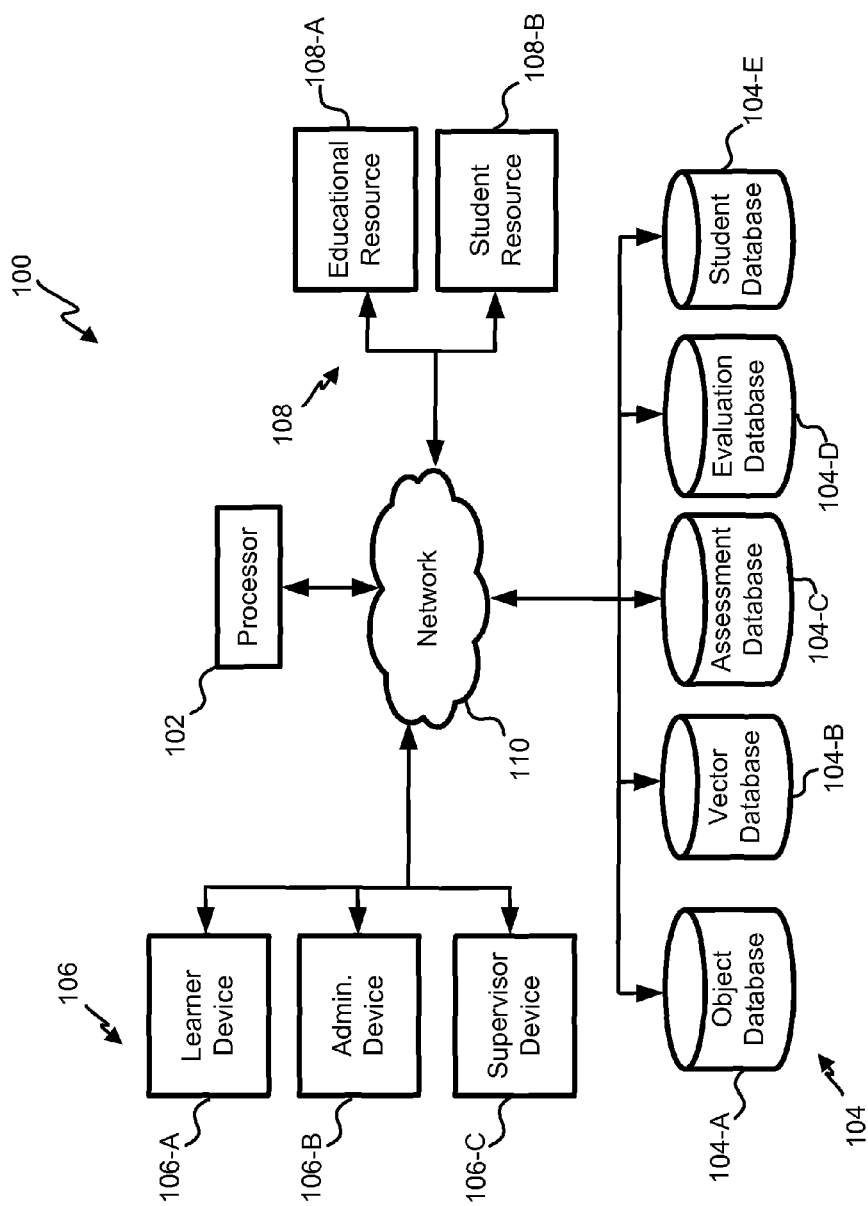
FIG. 1 is a schematic illustration of one embodiment of a learning system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In one embodiment the present disclosure relates to systems and methods for recommending a learning path. In some embodiments, the recommending of a learning path can include, for example, identifying a student's location within a learning object network that can be made of a plurality of learning objects that are interconnected by a plurality of learning vectors. The learning objects can each be an aggregation of content that can be, and some embodiments, associated with an assessment. The learning vectors can each connect two of the learning objects and thereby define a prerequisite relationship wherein the prerequisite learning object is referred to as the incidental learning object and the other learning object is referred to as the terminal learning object. Systems and methods for recommending a learning path can further include identifying a student target learning object and multiple paths made up of unique combinations of learning objects and learning vectors to reach the target learning object from the student's current position within the learning object network.

In some embodiments, student information can be retrieved. This information can include student context which can identify a student's past performance and/or performance history and/or one or more learning styles of the student. In some embodiments, information relating to the learning objects in the different learning paths can be retrieved. This information can identify the speed with which students traversed the learning vectors in the learning paths, the degree of success had by students in traversing the learning vectors of the learning path, and one or both of the speed with which students traversed the learning vectors in the learning path and the/or the degree of success had by students in traversing the learning vectors in the learning paths adjusted for the student context of the current student. After the student context and the learning vector context are retrieved, the magnitudes of the different learning paths are calculated. These magnitudes can indicate the expected speed with which the student will traverse the learning path. In some embodiments, the strengths of the different learning paths are calculated, which strength indicate the expected degree of success a student will have in traversing the learning vector. The learning paths are relatively ranked based on one or both of the magnitudes and strengths of the learning paths. In one embodiment, one of the learning paths is selected based on one or both of the magnitudes and strengths of the learning paths, and the selected learning path is provided to the student.

With reference now to FIG. 1, a block diagram of one embodiment of a learning system 100 is shown. The learning system 100 collects, receives, and stores data relating to the actions of one or several students within a learning object network. In some embodiments, the learning object network can include a plurality of learning objects that are linked in prerequisite relationships via a plurality of learning vectors. The learning system 100 utilizes this data to create, maintain, and update learning vectors connecting learning objects within the learning object network. In some embodiments, the learning vectors can be updated based on the success and/or failure of a student in traversing the learning vector, the context of the learning vector, and/or the student context. In some embodiments, the learning vector context can be the aggregated information relating to the learning vector. This can include identification of the prerequisite relationship between the learning objects directly connected by the learning vector, the magnitude of the learning vector, the strength of the learning vector, and/or any other desired parameter of the learning vector. In some embodiments, the strength of the learning vector context can vary based on the student context. Thus, in some embodiments, the strength and/or magnitude of the learning vector can vary with respect to different student contexts. Thus, some student contexts may correspond to an increased strength and/or magnitude of the learning vector whereas other student contexts may correspond to a decreased strength and/or magnitude of the learning vector.

The learning system 100 can include a processor 102. The processor 102 can provide instructions to, and receive information from the other components of the learning system 100. The processor 102 can act according to stored instructions, which stored instructions can be located in memory associated with the processor and/or in other components of the learning system 100. The processor 102 can be a microprocessor, such as a microprocessor from Intel® or Advanced Micro Devices, Inc.®, or the like.

The learning system 100 can include one or several databases 104. The one or several databases 104 can comprise stored data relevant to the functions of the learning system 100. The one or several databases 104 can include an object database 104-A. The object database 104-A can include data relating to one or several learning objects. In some embodiments, a learning object can be an aggregation of learning content that can be, for example, associated with an assessment such as, for example, a test, quiz, one or several practice problems or questions, homework, or the like. The object database 104-A can, in some embodiments, include the learning objects, including any subcomponents of the learning objects such as, for example, one or several content objects containing instructional material, and specifically comprising a presentation of learning material and/or one or several assessment objects which can comprise a content object that includes features configured to assess the learning and/or mastery of the subject matter of one or several content objects by the student. In some embodiments, the learning object can include an initial content object and/or assessment object, one or several intermediate content objects and/or assessment objects, and one or several terminal content objects and/or assessment objects. In one embodiment, the terminal assessment object can assess the student's mastery of the content contained in some or all of the content objects within the learning object.

The object database 104-A can include information to allow customization of the student learning experience. In one embodiment, for example, the object database 104-A can include threshold data that can be used in connection with student results to determine if a student is meeting expectations, exceeding expectations, far exceeding expectations, failing to meet expectations, or providing completely unsatisfactory results. In some embodiments, the object database 104-A can include thresholds that can be used to trigger the providing of learning objects to the student, which learning objects are not included in the selected learning path. In one embodiment, the object database 104-A can include one or several enhancement thresholds, and in some embodiments, the object database 104-A can include one or several remediation thresholds. In some embodiments, these learning objects can be one or several enhancement objects for a student who is exceeding and/or far exceeding expectations, and in some embodiments the learning objects can be one or several remedial objects for a student who is not meeting expectations.

The one or several databases 104 can include a vector database 104-B. The vector database 104-B can include information relating to one or several learning vectors. In some embodiments, and as discussed above, the learning object network can contain a plurality of learning objects. These objects can be connected via a plurality of learning vectors. A learning vector can connect a first learning object to a second learning object and can indicate a prerequisite relationship between the first and second learning objects, which prerequisite relationship can indicate the temporal order in which the first and second learning objects should be completed and/or attempted. In some embodiments, the first learning object, which is a prerequisite to the second learning object within the set defined by the first and second learning objects connected within a prerequisite relationship by the learning vector, can be identified as the incident learning object ($LO_I$), and the second learning object can be identified as the terminal learning object ($LO_T$).

In some embodiments, the vector database 104-B can include information relating to a variety of parameters of the learning vector. In some embodiments, this can include, for example, the strength of the learning vector, which strength can indicate the effectiveness of the learning vector and/or the degree to which students successfully traverse the learning vector and complete the learning object, the magnitude of the learning vector, which magnitude can provide an indicator of the rate at which one or several students have traversed and/or are expected to traverse the learning vector, a learning vector context including, for example, information identifying the strength and/or magnitude of the learning vector for one or several student contexts, or the like.

The learning system 100 can include an assessment database 104-C. The assessment database 104-C can include information identifying the connection and/or connections between learning objects within the learning object network. In some embodiments, the assessment database 104-C can include information relating to multidimensional linking between one or several learning objects. In some embodiments, the multiple dimensions of the learning object network can be the subject matter of the learning object network, skills that are relevant to the completion and/or comprehension of the subject matter of the learning object network skills but that are not the object of the learning object network such as, for example, reading (lexile) skills and math (quantile) skills. In some embodiments, information contained within the assessment database 104-C can be used in placing the learning objects within the learning object network and/or in connecting new learning objects with other objects within the learning object network.

The learning system 100 can include an evaluation database 104-D. The evaluation database 104-D can include information used in evaluating the effectiveness of one or several learning objects, one or several learning sequences, one or several content objects, one or several assessment objects, and/or the like. In some embodiments, for example, this information can include one or several effectiveness thresholds which can define the boundary between satisfactory results associated with one or several of the above and unsatisfactory results associated with one or several of the above.

The learning system 100 can include a student database 106-E. The student database 106-E can include information relating to one or several students including, for example, student contexts for one or several students. In some embodiments, a student context can contain information relating to past learning completed by the associated student, objectives of the student, which objectives can be the learning goals of the student including, for example, the achievement of a desired or specified position within the learning object network, and/or the learning style of the student. In some embodiments, the information contained within student database 106-E can be updated based on the results of interactions between the student and the learning object network. In some embodiments, and based on continual updates to the student context, information contained within the student database 106-E can be biased for temporal significance in that a biasing function can be applied to information contained within the student database to place greater weight on recently collected data. In some embodiments, the temporal biasing function can advantageously allow recently collected data to more significantly affect the student context than older, and potentially stale data relating to the student.

The learning system 100 can include one or several user devices 106, which can include, a student device 106-A, an administrator device 106-B, and/or a supervisor device 106-C. The user devices 106 allow a user, including a student including a learner, an evaluator, a supervisor, a trainer, and/or a trainee to access the learning system 100. The details and function of the user devices 106 will be discussed at greater length in reference to FIG. 2 below.

The learning system 100 can include a data source 108. The data source 108 can be the source of the one or several learning objects, content objects, assessment objects, or the like, and can be the source of some or all of the student information stored within the student database 104-D. In some embodiments, the data source 108 can include, for example, an educational resource 108-A and a student resource 108-B. In some embodiments, the educational resource 108-A can include a Learning Management System (LMS), an educational institution, a training institution, or the like, and a student resource 108-B can include, for example, any source of information relating to the student and/or past student performance.

The learning system 100 can include a network 110. The network 110 allows communication between the components of the learning system 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

Figure 2:
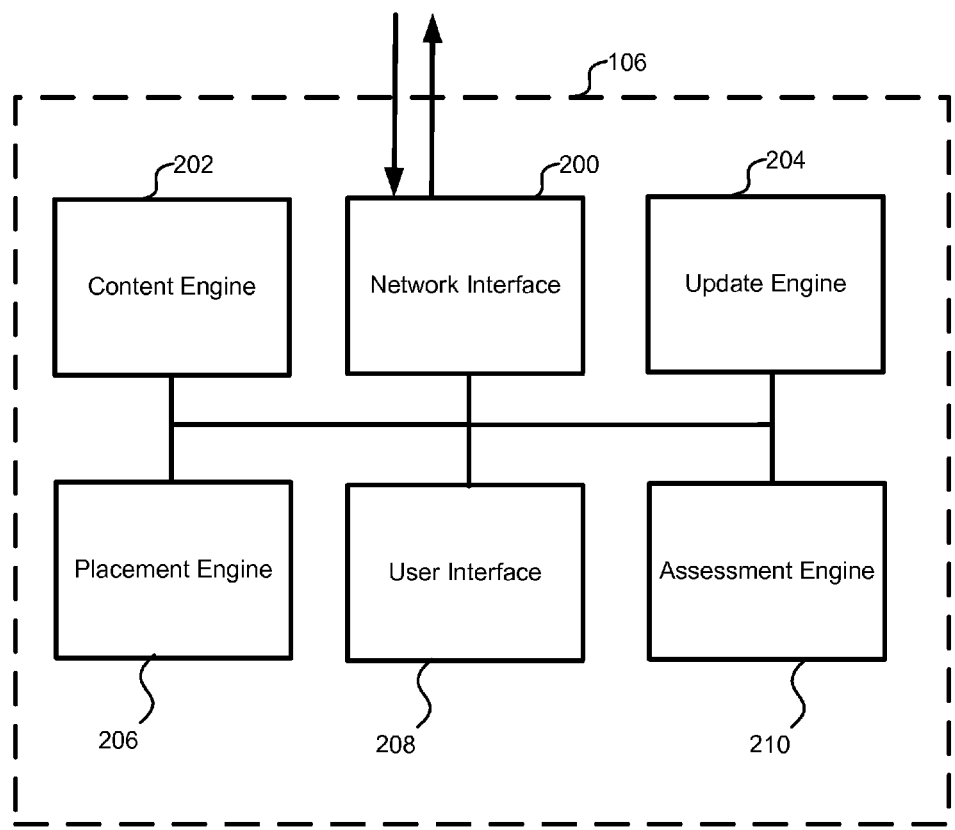
FIG. 2 is a schematic illustration of one embodiment of a user device for use with the learning system.

With reference now to FIG. 2, a block diagram of one embodiment of a user device 106 is shown. As discussed above, the user device 106 can be configured to provide information to and/or receive information from other components of the learning system 100. The user device can access the learning system 100 through any desired means or technology, including, for example, a webpage, a web portal, or via network 110. As depicted in FIG. 2, the user device 106 can include a network interface 200. The network interface 200 allows the user device 106 to access the other components of the learning system 100, and specifically allows the user device 106 to access the network 110 of the learning system 100. The network interface 200 can include features configured to send and receive information, including, for example, an antenna, a modem, a transmitter, receiver, or any other feature that can send and receive information. The network interface 200 can communicate via telephone, cable, fiber-optic, or any other wired communication network. In some embodiments, the network interface 200 can communicate via cellular networks, WLAN networks, or any other wireless network.

The user device 106 can include a content engine 202. The content engine 202 can receive one or several learning objects and/or content objects from the object database 104-A, and can communicate them to the user via the user interface of the user device 106.

The user device 106 can include an update engine 204. In some embodiments, the update engine 204 can be configured to receive information relating to the traversal of one or several learning vectors and update the learning vectors based on the student experience associated with the terminal learning object of the one or several learning vectors. In some embodiments, the update engine 204 can be configured to update the learning vector according to the student context and/or the context of the learning vector. In some embodiments, this can include updating the learning vector according to one or several learning styles. In some embodiments, the update engine 204 can receive information from, and/or provide information to the vector database 104-B.

The user device 106 can include a placement engine 206. The placement engine 206 can be configured to place one or several learning objects within the learning object network. Specifically, in some embodiments, the placement engine can be configured to identify prerequisite relationships for a new learning object. In some embodiments, these prerequisite relationships can be within the subject matter of the learning object in some embodiments, these prerequisite relationships can be outside of the subject matter of the learning object. In some embodiments, the placement engine 206 can receive information from, and/or send information to the assessment database 104-C.

The user device 106 can include a user interface 208 that communicates information to, and receives inputs from a user. The user interface 208 can include a screen, a speaker, a monitor, a keyboard, a microphone, a mouse, a touchpad, a keypad, or any other feature or features that can receive inputs from a user and provide information to a user.

The user device 106 can include an assessment engine 210. The assessment engine can be configured to assess the effectiveness of one or several items within the learning object network including, for example, one or several learning objects, one or several learning sequences, and/or one or several content objects. In some embodiments, the assessment engine 210 can assess the contents of the learning object network in connection with information stored within the evaluation database 104-D. In some embodiments, the assessment engine 210 can send information to, and/or receive information from the evaluation database 104-D.

Figure 3:
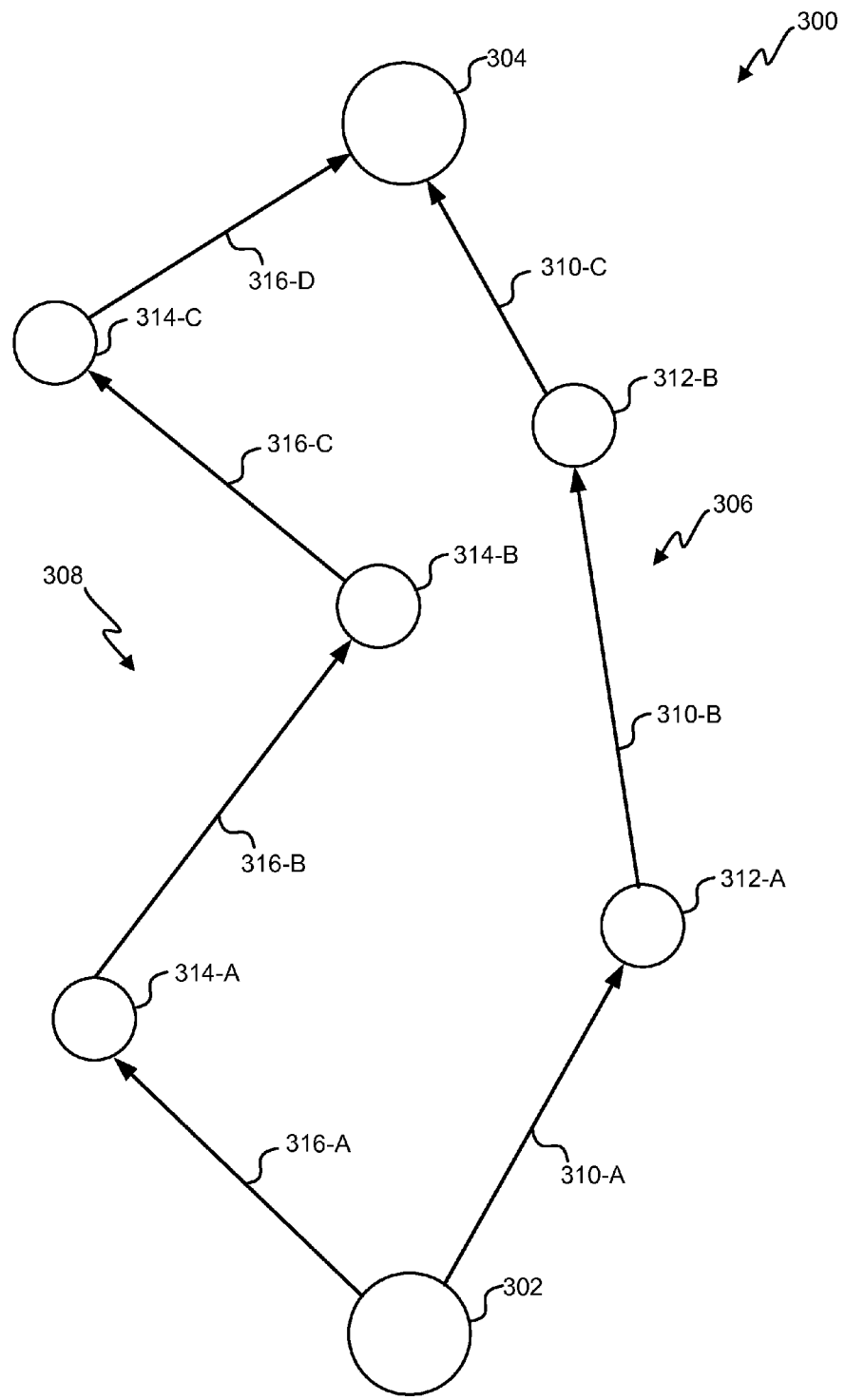
FIG. 3 is a schematic illustration of one embodiment of a learning object network containing two indicated learning sequences.

With reference now to FIG. 3, a schematic illustration of one embodiment of the learning object network 300 is shown. In some embodiments, the learning object network 300 can comprise a plurality of learning objects connected via a plurality of learning vectors. In the embodiment depicted in FIG. 3, the learning object network 300 includes a starting learning object 302 and a destination learning object 304. As seen in FIG. 3, the starting learning object 302 and the destination learning object 304 are connected by a first learning sequence 306 and the second learning sequence 308. The first learning sequence 306 comprises learning objects 312-A and 312-B which are connected with each other and with both of the starting learning object 302 and the destination learning object 304 via learning vectors 310-A, 310-B, and 310-C. Similarly, the second learning sequence 308 comprises learning objects 314-A, 314-B, and 314 C, which are connected with each other and with both of the starting learning object 302 and the destination learning object 304 via learning vectors 316-A, 316-B, 316-C, and 316-D. As seen in FIG. 3, the magnitude of the learning vectors 310-A, 310-B, 310-C, 316-A, 316-B, 316-C, 316-D is not constant and some of the learning vectors 310-A, 310-B, 310-C, 316-A, 316-B, 316-C, 316-D have a greater magnitude than others of the learning vectors 310-A, 310-B, 310-C, 316-A, 316-B, 316-C, 316-D, and some of the learning vectors 310-A, 310-B, 310-C, 316-A, 316-B, 316-C, 316-D have a lesser magnitude than others of the learning vectors 310-A, 310-B, 310-C, 316-A, 316-B, 316-C, 316-D. Similarly, the aggregate magnitude of the first learning sequence 306, which aggregate magnitude is the sum of the magnitudes of the learning vectors 310-A, 310-B, 310-C in the first learning sequence 306, is less than the aggregate magnitude of the second learning sequence 308, which aggregate magnitude is the sum of the magnitudes of the learning vectors 316-A, 316-B, 316-C, 316-D in the second learning sequence 308. In some embodiments, the magnitude of the learning vectors 310-A, 310-B, 310-C, 316-A, 316-B, 316-C, 316-D and/or the magnitude of the learning sequence 306, 308 can correspond to the length of time required to complete a learning vector 310-A, 310-B, 310-C, 316-A, 316-B, 316-C, 316-D and/or a learning sequence 306, 308, by the effectiveness and teaching mastery of the subject matter of the same.

Figure 4:
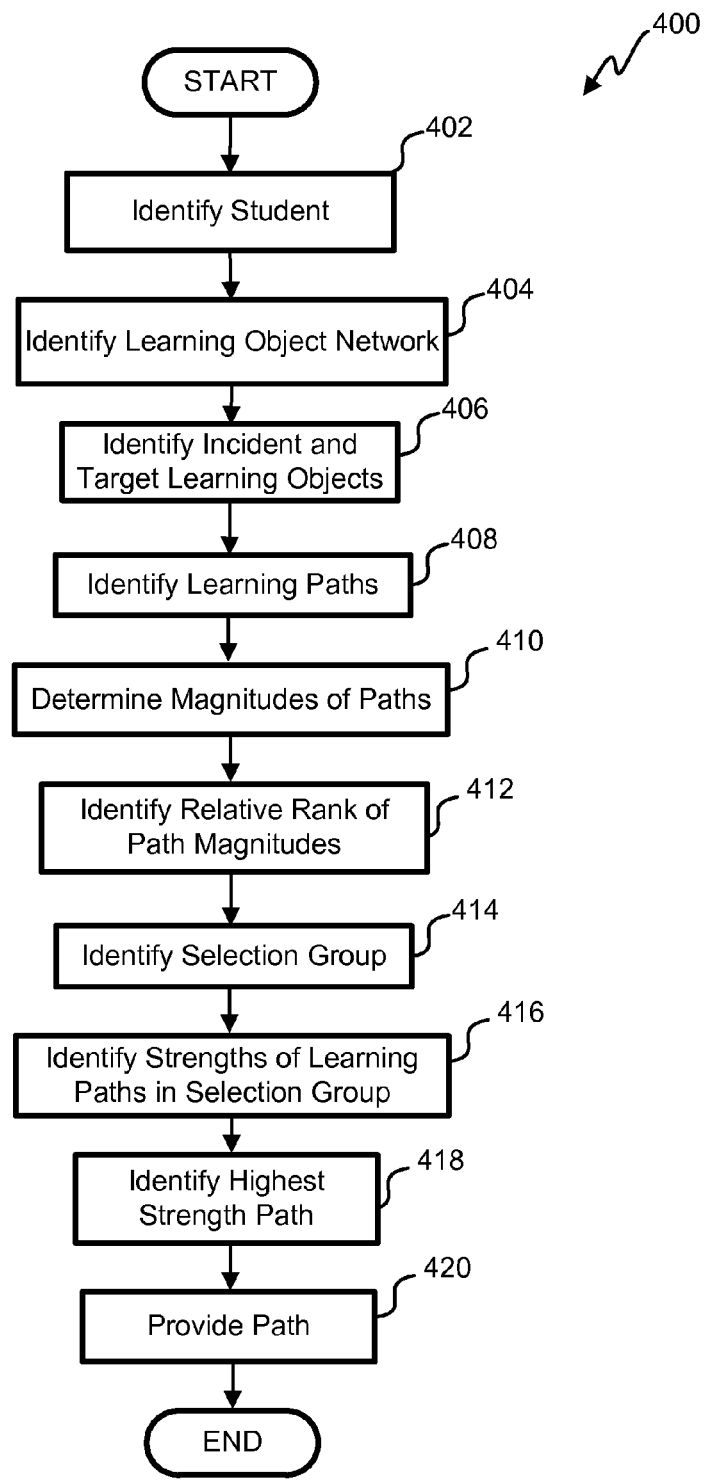
FIG. 4 is a flowchart illustrating one embodiment of a process for learning path assignment.

With reference now to FIG. 4, a flowchart illustrating one embodiment of a process 400 for learning path assignment is shown. In some embodiments, the process 400 can be used in connection with the learning object network to evaluate one or several learning paths. In some embodiments, this evaluation of the learning paths can facilitate in providing a learning path to the student. In some embodiments, the process 400 can be performed by the learning system 100 or a component thereof including, for example, the processor 102 and/or the user device 106.

The process 400 begins at block 402 wherein the student is identified. In some embodiments, for example, the student can be identified based on student interactions with the learning system 100. These interactions can include, for example, the student accessing the learning system 100 including, for example, the student logging onto the learning system 100. In some embodiments, the identification of the student can further include the retrieval of student information including, for example, the student context from the student database 104-E.

After the student has been identified, the process 400 proceeds to block 404 wherein the learning object network is identified. In some embodiments, for example, the learning system 100 can include information relating to a plurality of learning object networks, and in some embodiments, the student can be involved with and/or complete learning objects in a plurality of learning object networks. In some embodiments, the identification of the learning object network can include, for example, retrieving information from the student database 104-E to identify learning object networks in which the student is involved, or in which the student has completed learning objects. In some embodiments, the identification of the learning object network can include retrieving information relating to some or all of the learning object networks contained in the databases 104 including, for example, object database 104-A. In some embodiments, the learning object networks can be provided to the student in connection with a prompt for the student to select one of the learning object networks, and the learning object network can be selected based on the student input received by the learning system 100.

In some embodiments, the learning system 100 can identify one or several learning object networks in which the student is involved and/or in which the student has completed learning objects and can retrieve student context information from the student database 104-E. In some embodiments, the learning system 100 can extract information identifying one or several student goals from the student context information and can use this goal information in selecting a learning object network. In one embodiment, for example, the learning system 100 can identify the learning object network corresponding to the goal requiring the greatest amount of time to complete; corresponding to a highest priority, corresponding to a student's learning weakness, or the like.

After the learning object network has been identified, the process 400 proceeds to block 406 wherein incident and target learning objects are identified. In some embodiments, the incident learning object can identify the current location of the student within the learning object network, and can correspond to, for example, the learning object most recently completed by the student, or a learning object designated as the incident learning object by a user such as, for example, the student, the teacher, or the like. In some embodiments, the incident learning object can be identified with information retrieved from the student database 104-E including, for example, the student context. In some embodiments, the student context can include information indicating the student's position within the learning object network. In some embodiments, the processor 102 and/or the user device 106 can analyze information retrieved from the student database 104-E to identify the incident learning object.

In some embodiments, the target learning object can identify a learning object, the completion of which is identified as a goal of the student's interaction with the learning object network. In some embodiments, the target learning object can be identified by a user including, for example, the student, the teacher, or the like. In some embodiments, the target learning object can be separated from the incident learning object by one or more learning vectors. In some embodiments, the target learning object can be identified with information retrieved from the student database 104-E. The information retrieved from the student database 104-E can include the student context, which student context can include information identifying the target learning object. In some embodiments, the processor 102 and/or the user device 106 can analyze information retrieved from the student database 104-E to identify the target learning object.

After the incident target learning object have been identified, the process 400 proceeds to block 408 wherein learning paths are identified. In some embodiments, the learning path can be one or several learning vectors that connect the incident learning object to the target learning object. In some embodiments in which the learning path comprises a plurality of learning vectors, the learning path can further include one or several learning objects that, in connection with the learning vectors, connect the incident learning object and the target learning object. In some embodiments, one or several learning paths can be identified by the evaluation of prerequisite relationships between one or both of the incident learning object and the target learning object. This evaluation can be performed by the processor 102 and/or the user device 106.

After one or several learning paths have been identified, the process 400 proceeds to block 410 wherein the magnitudes of the learning paths are determined. In some embodiments, this determination can include the identification of all of the learning vectors within one of the learning paths, the retrieval of information relating to the learning vectors within one of the learning paths from the vector database 104-B, the determination of the magnitude of the learning vectors within one of the learning paths, and the summation of the magnitudes of the learning vectors within the one of the learning paths. In some embodiments, this determination can further include associating a value indicative of the completion of the calculation of the magnitude of the learning path with the learning path for which the magnitude was calculated, determining if a magnitude has been determined for all of the learning paths, and if the magnitude has not been determined for all the learning pounds, calculating a magnitude for the others of the learning paths. In some embodiments, this step can be performed by the processor 102 and/or by the user device 106.

After the magnitudes of the paths have been determined, the process 400 proceeds to block 412 wherein the relative rank of the path magnitudes is identified. In some embodiments, this can include comparing the magnitudes of the learning paths, and associating the learning paths with a value indicative of the size and/or relative size of the magnitudes of the learning paths. In some embodiments, the aggregate of these values can allow the ranking of the learning paths from largest to smallest magnitude. In some embodiments, this step can be performed by the processor 102 and/or by the user device 106.

In some embodiments, for example, the identification of the relative rank of the path magnitudes can include storing a value indicative of and/or representing the magnitude of each of the learning paths. The identification of the relative rank of the path magnitudes can further include the comparison of the values indicative of and/or representing the magnitude of each of the learning paths. In some embodiments, a first value associated with the first learning path can be compared to a second value associated with the second learning path and any other values associated with any other additional learning paths to determine which of the first, second, or other values represents a relatively larger and/or smaller magnitude and/or largest or smallest magnitude. In some embodiments, a binary value can be associated with some or all of the compared learning paths. In one embodiment, for example, a first binary value can be associated with the one of the values indicative of magnitudes of learning paths that represents a comparatively smaller magnitude and a second binary value can be associated with the one of the values indicative of the magnitudes of learning paths that represents the comparatively larger magnitude. In some embodiments, the magnitudes of the learning paths and/or the values representing the magnitudes of the learning paths can all be relatively ranked.

After the relative ranking of the magnitudes of the learning paths and/or of the values representing the magnitudes of the learning paths has been completed, one or several values indicating the relative ranking of the magnitudes of the learning paths and/or of the values representing the magnitudes of the learning paths can be stored. In some embodiments, these can be stored within one of the databases 104.

After the relative rank of the path magnitudes has been identified, the process 400 proceeds to block 414 wherein a selection group is identified. In some embodiments, the selection group can comprise a subset of the identified learning paths that meet a selection condition. In some embodiments, the selection group can comprise the subset of the identified learning paths from which the provided path is selected. The selection condition can be any condition that can be used to identify one or several learning paths. In some embodiments, the selection condition can correspond to an absolute aspect of a learning path such as, for example, an attribute of the learning path, the existence of which determines the inclusion of the learning paths within the selection group, and in some embodiments, the selection condition can correspond to a relative aspect of the learning path such as, for example, an attribute of the learning path relative to the identified learning paths, the existence of which determines the inclusion of the learning path within the selection group. In one embodiment, an absolute aspect can include, a maximum or a minimum number of learning objects and/or learning vectors within the learning path, a maximum or minimum magnitude of the learning path or of learning vectors within the learning path. In some embodiments, a relative aspect can include selecting, for example, 2 learning paths, 3 learning paths, 4 learning paths, 5 learning paths, 10 learning paths, 20 learning paths, or any other or intermediate number of learning paths having the largest or smallest magnitudes. In some embodiments, the selection group can be identified by the learning system 100 or component thereof including the processor 102 and/or the user device 106.

In some embodiments, steps 416 and 418 can be skipped. In such embodiments, the process 400 proceeds to block 420 and the learning path having the largest or smallest magnitude is provided to the user. In some embodiments, the learning path can be provided to the user by the user device 106, and specifically by the user interface 208 of the user device 106.

In embodiments in which steps 416 and 418 are not skipped, the process 400 proceeds block 416 wherein the strength of the learning paths in the selection group is identified. In some embodiments, the strength of one of the learning paths can comprise a value corresponding to the strength of the learning vectors within the one of the learning paths. In some embodiments, the strength of the one of the learning paths can be the average of the strength of the learning vectors within the one of the learning paths.

The strength of the learning paths can be determined by the retrieval of strength information for the learning vectors of the one of the learning paths from the vector database 104-B. In some embodiments, the strength information can be the generic strength of the learning vectors in the one of the learning paths, and in some embodiments, the strength information can be strength of aspects of the learning vector context that correspond to aspects of the student context. After the strength information has been retrieved from the vector database 104-B, the processor 102 and/or the user device 106 can generate the value indicative of the strength of the learning path. In some embodiments, this process can be repeated until the strength of all of the learning paths within the selection group has been identified.

After the strengths of the learning paths in the selection group have been identified, the process 400 proceeds to block 418 wherein the learning path having the highest strength is identified. In some embodiments, for example, this identification can be achieved via the comparison of the strengths of the learning paths in the selection group. This comparison can be performed by the processor 102 and/or the user device 106.

In some embodiments, the identification of the path having the highest strength can comprise generating a value from a combination of the learning path strength and learning path magnitude. In some embodiments, this value can be optimized to reflect a combination of likelihood of success in traversing the learning vector and expected speed of the traversal of the learning vector. In some embodiments, the learning path corresponding to the value indicating the best combination of the likelihood of success in traversing the learning vector and expected speed of traversal of the learning vector can be selected. This comparison can be performed by the processor 102 and/or the user device 106.

After the learning path having the highest strength has been identified, the process 400 proceeds to block 420 wherein the learning path having the highest strength is provided. In some embodiments, the learning path can be provided to the user by the user device 106, and specifically by the user interface 208 of the user device 106.

Figure 5:
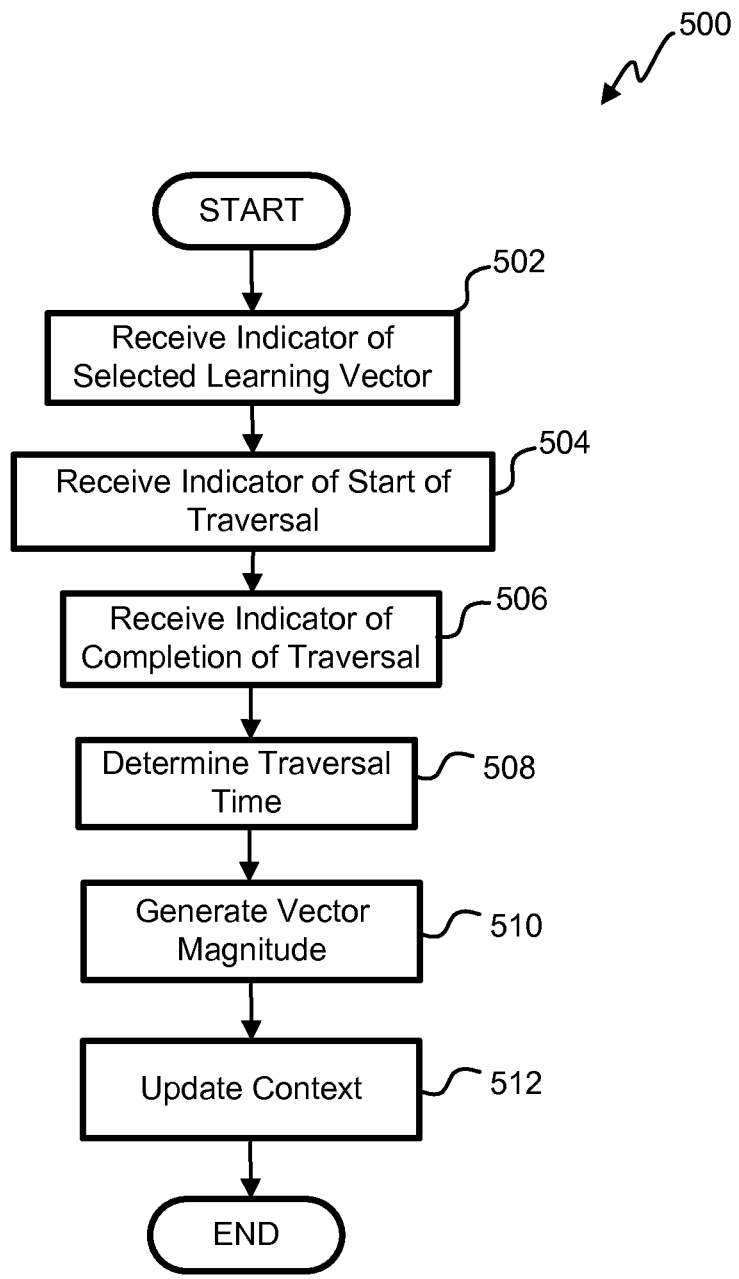
FIG. 5 is a flowchart illustrating one embodiment of a process for generating a magnitude of a learning vector.

With reference now to FIG. 5, flowchart illustrating one embodiment of a process 500 for generating a magnitude of a learning vector is shown. In some embodiments, the process 500 can be performed by the processor 102 and/or the user device 106 to generate the magnitude of the learning vector and/or to determine the amount of time spent in traversing the learning vector. The process 500 begins at block 502 wherein an indicator of a selected learning vector is received. In some embodiments, this indicator can be received by the user device 106 in response to the user selection of the learning vector for traversal.

After the indicator of the selected learning vector is received, the process 500 proceeds to block 504 wherein an indicator of the start of the traversal is received. In some embodiments, the indicator of the start of the traversal can be an indicator of student action relating to one or several of the content objects of the terminal learning object of the learning vector. In one embodiment, for example, the indicator of the start of the traversal of the learning vector can be provided when the user accesses the content of the terminal learning object. In some embodiments, this access can be satisfied when a user merely opens and/or retrieves content from the terminal learning object, and in some embodiments, this access is satisfied when the user achieves and/or maintains a desired level of interaction with the content of the terminal learning object. Advantageously, determining access based on user levels of interaction with the content of the terminal learning object can increase the accuracy of the determination of the magnitude of the learning vector by allowing the elimination of nonproductive time in which the content of the terminal learning object is merely open and in which the user is not interacting with the content of the terminal learning object and/or in which the user is trivially interacting with the content of the terminal learning object such as when the user's interaction with the content of the terminal learning object does not reach a desired level. In some embodiments, the indicator of the start of the traversal of the learning vector can comprise a timestamp indicating the date and/or time at which the user accessed the content of the terminal learning object and/or interacted with the content of the terminal learning object at a desired level.

After the indicator of the start of the traversal has been received, the process 500 proceeds block 506 wherein an indicator of the completion of the traversal of the learning vector is received. In some embodiments, for example, the indicator of the completion of the traversal of the learning vector can identify when the user has completed the tasks associated with the terminal learning object and/or ended access to content associated with the terminal learning object. In some embodiments, the indicator of the completion of the traversal of the learning vector can comprise a timestamp identifying the date and/or time at which the user completed the tasks associated with the terminal learning object and/or ended access to content associated with the terminal learning object. In some embodiments, steps 502 to 506 can be repeated until the learning vector has been traversed.

After the indicator of the completion of the traversal of the learning vector has been received, the process 500 proceeds to block 508 wherein the traversal time is determined. In some embodiments, this determination of the traversal time can comprise determining the total time between the receipt of the indicator of the start of the traversal of the learning vector and the receipt of the indicator of the completion of the traversal of the learning vector, determining the amount of time between the receipt of the indicator of the start of the traversal of the learning vector and the receipt of the indicator of the completion of the traversal of the learning vector in which the user was interacting with the content of the terminal learning object at or above a satisfactory level, repeating the previous two steps if multiple indicators of the start of the traversal of the learning vector and the completion of the traversal of the learning vector were received, and, if multiple indicators of the start of the traversal of the learning vector and of the completion of the traversal of the learning vector were received, aggregating the time, including one or both of the total time and the time in which the user interaction with the content of the terminal learning terminal object is at or above a satisfactory level.

After the traversal time has been determined, the process 500 proceeds block 510 wherein the vector magnitude is generated. In some embodiments, the vector magnitude can comprise a value indicative of the amount of time used in traversing the learning vector. This value can be generated with, for example, the processor 102 and/or the user device 106. In some embodiments, when a magnitude for the learning vector has already been generated using data relating to previous student traversals of the learning vector, the magnitude of the learning vector can be updated with the traversal time determined in block 508.

After the vector magnitude has been generated, the process 500 proceeds block 512 wherein the learning vector context is updated. In some embodiments, for example, the update of the learning vector context can be performed by retrieving the learning vector context from one of the databases 104, updating the learning vector context with the new and/or updated magnitude of the learning vector, and saving the updated learning vector context in one of the databases 104 such as, for example, the vector database 104-B.

Figure 6:
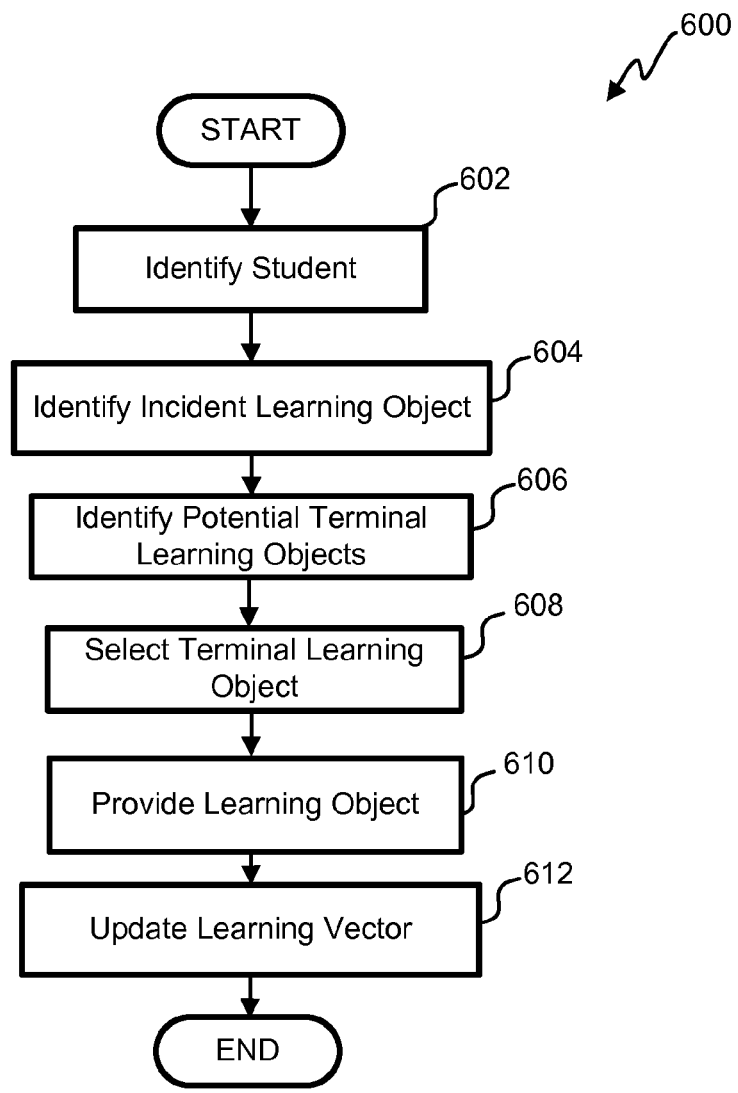
FIG. 6 is a flowchart illustrating one embodiment of a process for selecting a terminal learning object and updating a learning vector.

With reference now to FIG. 6, a flowchart illustrating one embodiment of a process 600 for selecting a terminal learning object and updating a student context is shown. The process 600 begins at block 602 wherein a student is identified. In some embodiments, the student is identified based on inputs received from the user device 106 and/or based on information stored within the student database 104-E. After the student has been identified, the process 600 proceeds to block 604 wherein the incident learning object is identified. In some embodiments, after the student has been identified, information relating to the student's progress in the learning object network 300 can be retrieved from the student database 104-E. This information can include, for example, the student context. This information can identify learning objects that the student has completed and can be used to thereby identify the incident learning object. In some embodiments, for example, the student context can include one or several values associated with one or several of the learning objects, which values can indicate whether the student has completed the one or several of the learning objects. In one embodiment, for example, these values can be extracted from the student context and the processor 102 can identify the incident learning object as the learning object from which no learning vector has been traversed.

After the learning object has been identified, the process 600 proceeds block 606 wherein potential terminal learning objects are identified. In some embodiments, for example, the potential terminal learning objects are learning objects connected to the incident learning object via a single learning vector. In one embodiment, for example, after the processor 102 has identified the incident learning object, the processor 102 can retrieve information relating to learning vectors from the incident learning object. The processor 102 can then identify the learning objects at which the identified learning vectors terminate. These identified learning objects are the potential terminal learning objects. In some embodiments, a value can be associated with the potential terminal learning objects, which value can identify the potential terminal learning objects.

After the potential terminal learning objects have been identified, the process 600 proceeds to block 608 wherein a terminal learning object is selected, for example, from one of the identified potential terminal learning objects. In some embodiments, for example, the selection can be made by the processor 102 based on information relating to the terminal learning objects and/or the learning vector leading to the terminal learning object. In some embodiments, for example, the combination of the student context as well as the learning vector context can be used by the processor 102 in selecting the terminal learning object.

After the terminal learning object has been selected, the process 600 proceeds to block 610 wherein the learning object is provided. In some embodiments, for example, the learning object can be provided to the user including, for example, the student, via the user device 106, and specifically via the network interface 200, the content engine 202, and/or the user interface 208. In some embodiments, providing the learning object to the user can further include receiving answers which can be, for example, the inputs provided by the user in response to the assessment and/or answer data which answer data can be, for example, data generated based on the answers such as an indication of correct or incorrect answers, a score, an evaluation, or the like.

After the learning object has been provided, the process 600 proceeds to block 612 wherein the student context is updated. In some embodiments, for example, the student context can be updated, by the processor 102 and/or the user device 106, according to the received answers and/or answer data. In some embodiments, the student context can be updated to reflect an aspect of student performance in traversing the learning vector and/or in completing the terminal learning object of the learning vector.

The following flowcharts illustrate embodiments of processes for updating a learning vector and/or for generating data used in updating the learning vector. These processes can be performed as part of process 600 depicted in FIG. 6, or separate from the process 600 depicted in FIG. 6.

Figure 7:
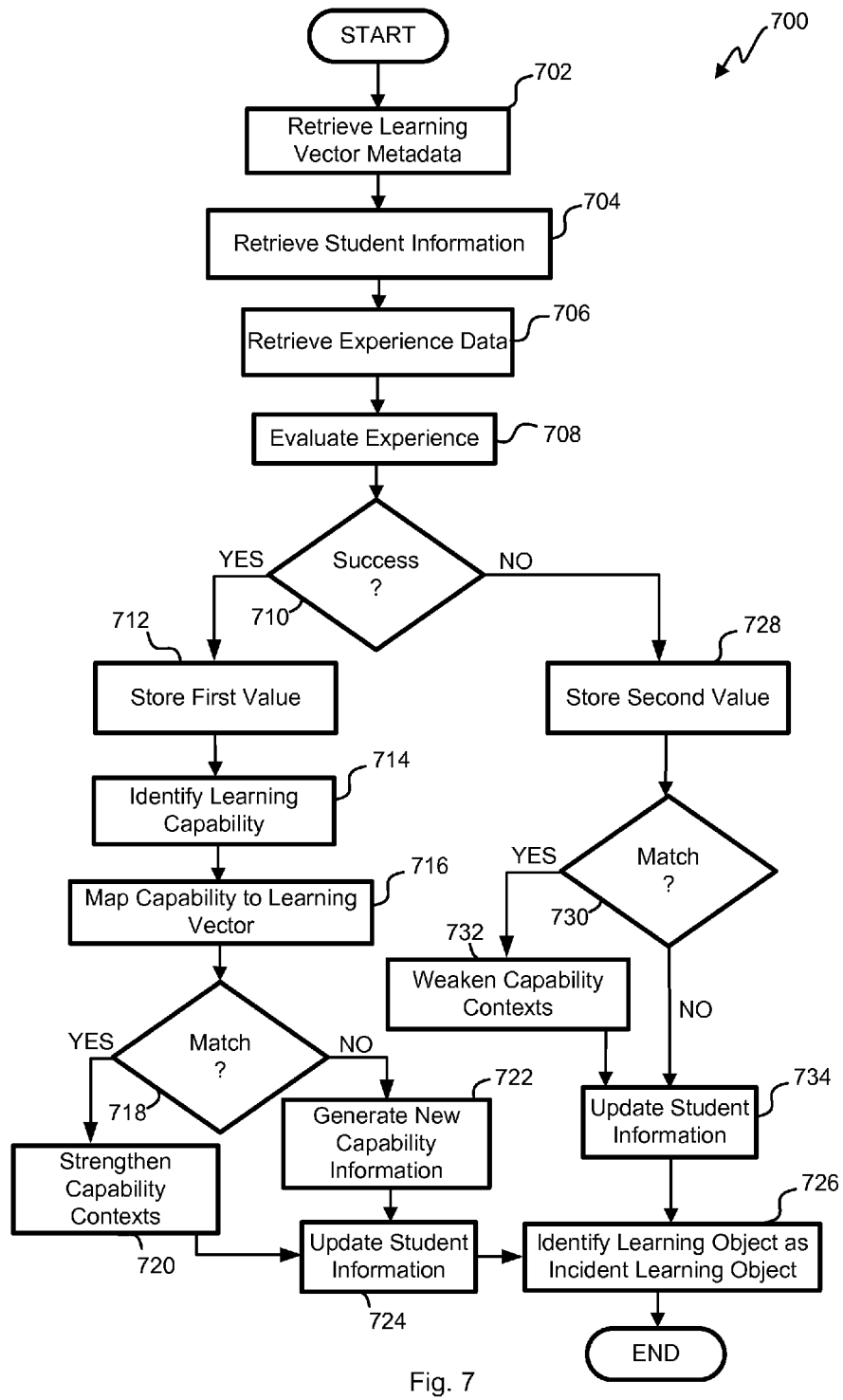
FIG. 7 is a flowchart illustrating one embodiment of a process for updating a student context based on the student outcome and a learning vector context.

With reference now to FIG. 7, a flowchart illustrating one embodiment of a process 700 for updating a student context based on a student outcome and a learning vector context is shown. The process 700 can be performed by the learning system 100 or by a component thereof including, for example, the processor 102 and/or the user device 106. The process 700 begins at block 702 wherein learning vector metadata is received. In some embodiments, the learning vector metadata can be received from the vector database 104-B, and can include information identifying the strength, magnitude, direction, or other aspects of the vector. In some embodiments, the vector metadata can include information identifying a learning vector context. The learning vector context can comprise aggregated data relating to students who have traversed the learning vector. In some embodiments, this information can include correlations between all or portions of the student context and outcomes of traversing the learning vector. In some embodiments this information can include correlations between the learning style of the student and the expected level of success in traversing the learning vector.

After the learning vector metadata has been received, the process 700 proceeds to block 704 wherein student information is retrieved. In some embodiments, the student information can comprise student context information, which student context can identify a student's learning style, the student's current learning objectives, and/or the student's learning performance history which can be, for example, biased for temporal significance. In some embodiments, the student context can be received from the student database 104-E.

After the student information has been retrieved, the process 700 proceeds to block 706 wherein experience data is retrieved. In some embodiments, the experience data can identify the student experience in traversing the learning vector. Specifically, the experience data can identify the success and/or degree of success of the student in traversing the learning vector, the speed with which the student traversed the learning vector, or the like. In some embodiments, the experience data can be retrieved from the user device 106 and/or the data source 108.

After the experience data has been retrieved, the process 700 proceeds to block 708 wherein the student experience is evaluated. In some embodiments, the evaluation of the student experience can be performed by the processor 102 and/or by the user device 106. In some embodiments, this evaluation can include determining whether the student successfully traversed the learning vector and successfully completed material associated with the learning object. After the student's experience with the learning vector has been evaluated, the process 700 proceeds to decision state 710 wherein it is determined if the student successfully traversed the learning vector. In some embodiments, this determination can be made by the processor 102 or the user device 106. In some embodiments, the determination of the student success can include associating a value, according to a Boolean function, with the student. In such an embodiment, a first value can be associated with the student if the student successfully traversed the learning vector, and a second value can be associated with the student if the student did not successfully traverse the learning vector.

If it is determined that the student successfully traversed the learning vector, then the process 700 proceeds to block 712 wherein the first value is stored. In some embodiments, the first value can be stored in one of the databases 104 including, for example, the student database 104-D. After the first value has been stored, the process 700 proceeds to block 714 wherein the learning capability of the student is identified. In some embodiments, the identification of the learning capability the student can include retrieving information from the student context identifying the student's learning style and/or the student's historic learning experiences. In some embodiments, this information can identify how a student learns, best modes for the student to learn, subject matter abilities or difficulties, or the like. In some embodiments, this identification can be performed by the processor 102, by the user device 106, or by a component of either of these.

After the learning capability of the student is identified, the process 700 proceeds to block 716 wherein the learning capability of the student is mapped to the learning vector, and specifically to the learning vector metadata including the learning vector context. In some embodiments, this step can include determining whether aspects of the student context, and specifically the student learning style correspond with information generated by students that have previously traversed the learning vector. In one embodiment, for example, this can include determining whether previously traversing students had the same learning style and/or same or similar learning context as the current traversing student. In some embodiments, this mapping can be performed by the processor 102 and/or by the user device 106.

After the capability of the student has been mapped to the learning vector, the process 700 proceeds to decision state 718 wherein it is determined if the student learning capability, and particularly, if the student learning style corresponds to the learning styles of students who successfully traversed the learning vector. This determination can be made, in some embodiments, by the processor 102 and/or by the user device 106. If it is determined that there is a match, then the process 700 proceeds to block 720 wherein the student contexts are strengthened. In some embodiments, this can include strengthening the aspects of the student context that relate to one or several learning styles. In some embodiments, for example, the strength of the student context can be increased by positively incrementing a value associated with the student context.

Returning again to decision state 718, if it is determined that the student learning capability does not correspond to the learning styles of students who have successfully traversed the learning vector, the process 700 proceeds to block 722, wherein new capability information is generated. In some embodiments, the new capability information can be information that relates to one or several learning styles, and can be information that can be added to the student context that can be, for example, stored in the student database 104-E. In some embodiments, the new capability information can correspond to the learning styles of students that have successfully traversed the current learning vector. In some embodiments, the new capability information can be generated by the processor 102 and/or the user device 106.

After the new capability information has been generated, or, returning again to block 720, after the capability contexts have been strengthened, the process 700 proceeds to block 724 wherein student information is updated. In some embodiments, the student information can be updated by storing information relating to the strengthening of capability contexts and/or to new capability information in the student database 104-D. After this information has been updated, the process 700 proceeds to block 726 wherein the completed learning object of the traversed learning vector is identified as a new incident learning object. In some embodiments, this can include associating a value with the completed learning object, and storing this value in, for example, the student database 104-E. In some embodiments, this step can further include identifying a new terminal learning object and the therewith associated learning vector. In some embodiments, this identification can be performed by the processor 102 or the user device 106, and can be based on information contained within one or more of the databases 104.

Returning again to decision state 710, if it is determined that the student did not successfully traverse the learning vector, then the process 700 proceeds to block 728 wherein the second value is stored. In some embodiments, the second value can be stored in one of the databases 104 including, for example, the student database 104-E.

After the second value has been stored, the process 700 proceeds to decision state 730 wherein it is determined if the learning capability of the student that currently traversed the learning vector, and particularly, if that student's learning style corresponds to the learning styles of students who previously successfully traversed the learning vector. In some embodiments, this can include identifying the learning capability of the student as discussed block 714 and/or mapping the learning capability of the student to the learning vector, and particularly to the context of the learning vector as discussed in block 716. This determination can be made, in some embodiments, by the processor 102 and/or by the user device 106. If it is determined that there is a match between the learning capability of the student that currently traversed the learning vector and students that previously successfully traversed the learning vector, then the process 700 proceeds to block 732 wherein the student context of the student that currently traversed the learning vector is weakened. In some embodiments, this can include weakening aspects of the student context indicative of one or several learning styles. In some embodiments, this weakening can include decrementing a value associated with the student context.

After the student context has been weakened, or, returning again to decision state 730, if it is determined that there is not a match between the student context of the student that currently traversed the learning vector and students that previously successfully traversed the learning vector, then the process 700 proceeds to block 734 wherein student information is updated. In some embodiments, for example, this can include updating the student context to reflect the failure of the student in traversing the learning vector. In some embodiments, for example, this can further include updating the student context to reflect the weakening of block 732.

After the student information has been updated, the process 700 proceeds to block 726 wherein the completed learning objective is identified as an incident learning objective and the new terminal learning objective and the associated learning vector is identified. In some embodiments, this identification can be performed by the processor 102 and/or the user device 106 and can be based on information contained within one or more of the databases 104.

Figure 8:
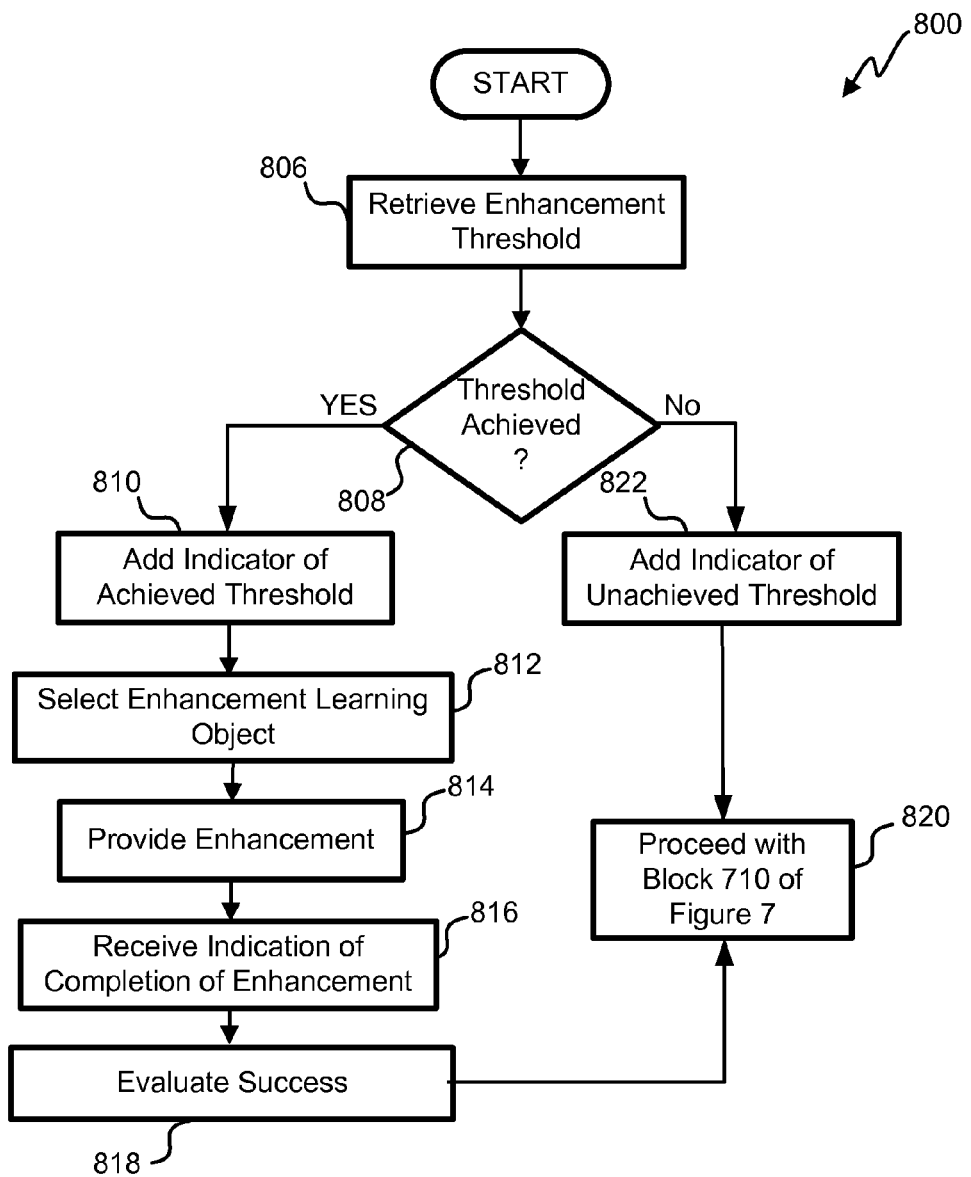
FIG. 8 is a flowchart illustrating one embodiment of a process for providing education enhancement to a student.

With reference now to FIG. 8, a flowchart illustrating one embodiment of a process 800 for providing education enhancement is shown. In some embodiments, the process 800 can be performed when a student's progress through learning objects exceeds a threshold. In such embodiments, this exceeding of the threshold indicates that the student has additional learning capacity. In some embodiments, this threshold can be a speed threshold indicating that the student is rapidly progressing through subject matter associated with one or several learning objects, and in some embodiments, the threshold can be an accuracy threshold indicating a high degree of student comprehension of the subject matter of the learning objects. In some embodiments, the threshold can be triggered based on student performance with respect to a single learning object, and in some embodiments, the threshold can be triggered based on student performance within a learning path comprising a plurality of learning objects. Thus, in one embodiment, if the speed with which the student completes a single learning vector, or completes a group of learning vectors exceeds a threshold, the student can be designated for enhancement. In some embodiments, for example, the enhancement designation can occur without student input, and in some embodiments, the enhancement designation can include student input. Thus, in some embodiments, the student can choose whether to receive an enhancement learning object. The process 800 can be performed as a part of process 700 depicted in FIG. 7, and specifically after the step of block 708 of FIG. 7. The process 800 can be performed by the learning system 100 and/or by a component thereof including, for example, the processor 102 or the user device 106.

The process 800 begins at block 806 wherein an enhancement threshold is retrieved. The enhancement threshold can define the boundary that when, surpassed, identifies a student as qualifying for an enhancement. In some embodiments, and as discussed above, the enhancement can include the providing of one or several additional learning objects, which learning objects are not included in the learning path. In some embodiments, the enhancement threshold can define an accuracy, a velocity, or any other indicator of student performance. In one embodiment, for example, the enhancement threshold can specify a velocity for completion of the learning object and/or a degree of success for completion of a learning object. In some embodiments, for example, when a student completes the learning object with a velocity higher than the threshold value and/or with a degree of success higher than the threshold value, the learning system 100 can recommend enhancement.

In some embodiments, the enhancement threshold can be retrieved from one of the databases 104 such as, for example, the object database 104-A. In some embodiments, the enhancement threshold can be associated with a single learning object, and in some embodiments, the enhancement threshold can be associated with the plurality of learning objects. Thus, in some embodiments, an enhancement threshold is retrieved that is specific to the currently traversed learning object, and in some embodiments, an enhancement threshold is retrieved that is nonspecific to the currently traversed learning object.

After the enhancement threshold has been retrieved, the process 800 proceeds to decision state 808 wherein it is determined if the enhancement threshold has been achieved. In some embodiments, for example, this can include comparing experience data with the enhancement threshold. In some embodiments, a binary value can be associated with the student experience data so as to indicate whether the threshold has been achieved. In one embodiment, for example, the determination of whether the threshold has been achieved can be performed according to a Boolean function wherein a first value is assigned if the threshold has been triggered and a second value is assigned if the threshold is not triggered. In some embodiments, this determination can be made by the processor 102 and/or the user device 106.

If it is determined that the threshold has been achieved, then the process 800 proceeds to block 810 wherein an indicator of the achieved threshold is added. In some embodiments, for example, this can include the storing of the first value assigned according to the Boolean function in one of the databases 104 such as, for example, in the student database 104-E.

After the indicator of the achieved threshold has been added, the process 800 proceeds to block 812 wherein the enhancement learning object is selected. In some embodiments, the enhancement learning object can be selected in a variety of manners. In some embodiments the enhancement learning object can comprise the same subject matter as the currently traversed learning vector and the currently completed learning object, and in some embodiments, the enhancement learning object can comprise subject matter different than that of the currently traversed learning vector. In some embodiments, the enhancement learning object can comprise the same subject matter as the currently completed learning object, but can have, for example, an increased quantile and/or lexile level. In some embodiments, the enhancement learning object can comprise information related to the subject matter of the currently traversed learning vector and the currently completed learning object such as, for example, in the event that the currently completed learning object is a non-history topic, the enhancement learning object may include history relating to the subject matter of the currently completed learning object. Thus, in some embodiments, the enhancement learning object can provide information that is relevant to and/or related to the subject matter of the currently completed learning object, but which information is not included in the current learning path.

The enhancement learning object can be selected in a variety of ways. In some embodiments, the enhancement learning object can be stochastically selected, and in some embodiments, the enhancement learning object can be selected based on the student context. Thus, in one embodiment, the enhancement learning object can be selected to facilitate the student's improvement in either expanding the student's learning styles, expanding the student's skills, and/or the like. In one embodiment, for example, the learning system 100 can analyze a student context to identify a weakness in the student skills and the enhancement learning objective can be selected so as to strengthen and/or improve this student weakness. In some embodiments, the enhancement learning object can be selected by, for example, the processor 102 and/or the user device 106.

After the enhancement learning object has been selected, the process 800 proceeds to block 814 wherein the enhancement learning object is provided. In some embodiments, the enhancement learning object can be provided to the student via the user device 106, and specifically via the user interface 208 of the user device 106. After the enhancement learning object has been provided, the process 800 proceeds to block 816 wherein an indication of the completion of the enhancement and/or the traversal of the enhancement vector is received. In some embodiments, this indication can be received by and/or from the user device 106 and can be provided to the other components of the learning system 100. In some embodiments, this indication can comprise an indication that the student received the learning material of one or several content objects of the enhancement learning object. In one embodiment, for example, the indication can comprise one or several answers provided in response to the content of the assessment object of the enhancement learning object.

After the indication of the completion of the enhancement object has been received, the process 800 proceeds to block 818 wherein the student success is evaluated. In some embodiments, the student success can be evaluated by comparing the indication of the completion of the enhancement learning object to answer data stored within one of the databases 104 such as, for example, the object database 104-A. In some embodiments, a score can be generated based on the number of questions that the student correctly answered and/or the level of accuracy provided by the student in response to the prompts of the assessment object.

After the student success has been evaluated, the process 800 proceeds to block 820 and proceeds with block 710 of FIG. 7. In some embodiments, for example, the process of FIG. 7 can be performed to update the student context with both information from the completed learning object that gave rise to the enhancement, as well as with the information from the completion of the enhancement learning object.

Returning again to decision state 808, if it is determined that the threshold has not been achieved, then the process 800 proceeds to block 822 wherein an indicator of the unachieved threshold is added. In some embodiments, for example, this can include the storing of the second value assigned according to the Boolean function in one of the databases 104 such as, for example, the student database 104-E. After the indicator of the non-achievement of the threshold has been added, the process 800 proceeds to block 820 and continues with block 710 of FIG. 7. In some embodiments, for example, the remaining steps of the process of FIG. 7 can be performed to update the student context with both information from the completed learning object that gave rise to the enhancement, as well as with the information from the completion of the enhancement learning object.

Figure 9:
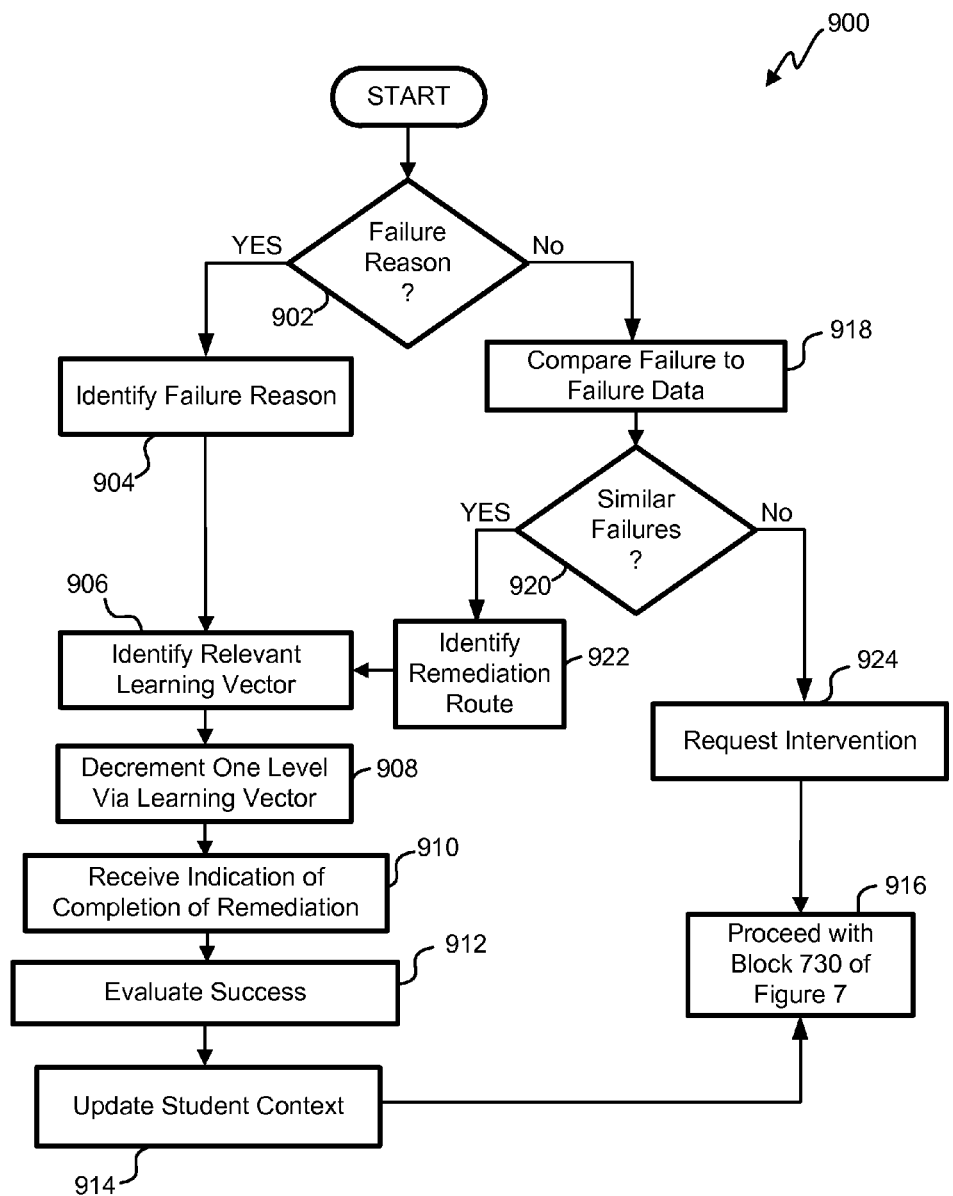
FIG. 9 is a flowchart illustrating one embodiment of a process for providing remediation to a student.

With reference now to FIG. 9, flowchart illustrating one embodiment of a process 900 for providing remediation to a student is shown. In some embodiments, the process 900 can be performed in response to a student failure with respect to one or several learning objects. The failure with respect to one or several learning objects can take a variety of forms. In one embodiment, for example, the failure can be based on responses provided to one or several assessment objects. The process 900 can be performed by the learning system 100 and/or a component thereof including, for example, the processor 102 and/or the user device 106.

The process begins at decision state 902 wherein it is determined if there is an identifiable failure reason. In some embodiments, for example, a student may fail to complete a learning objective based on, for example, a deficiency in unrelated subject matter such as a quantile and/or lexile deficiency, and in some embodiments, the student may fail based on a subject matter deficiency, such as, for example, failing to adequately master some or all prerequisite material. In some embodiments, this determination can be performed by the processor 102 and/or the user device 106.

If there is an identifiable failure reason, then the process 900 proceeds to block 904 wherein the failure reason is identified. In some embodiments, the failure reason can be identified by analysis of the student context and/or inputs provided in response to the assessment object. In some embodiments, the failure reason can be determined by analysis of information relating to the learning object and/or the learning vector such as the vector context which can be retrieved from, for example, the object database 104-A and/or the vector database 104-B. In some embodiments, for example, a learning vector and/or a learning object can be associated with a quantile level and in some embodiments, the determination of decision state 902 can include a comparison of the quantile and/or lexile levels of the learning object with context information relating to the learning object and/or the learning vector. In some embodiments, the determination of the failure reason can be performed by the processor 102 and/or the user device 106.

After the failure reason has been identified, the process 900 proceeds to block 906 wherein the relevant learning vector is identified. In some embodiments, for example, the relevant learning vector is the learning vector that addresses the source of the failure. Thus, in some embodiments, the relevant learning vector can correspond to a learning object that will facilitate in increasing the quantile and/or lexile level of the student, and in some embodiments, the relevant learning vector can correspond to a learning vector that will facilitate increasing the student's comprehension of prerequisite subject matter. After the relevant learning vector has been identified, the process 900 proceeds to block 908 wherein the student is stepped back to a lower level learning object via the identified learning vector. In some embodiments, for example, this can correspond to the student being stepped back to subject matter having a lower quantile and/or lexile level and/or being stepped back to a learning object comprising prerequisite subject matter. In some embodiments, this step can further comprise providing the student with the decremented learning object via, for example, the user interface 208 of the user device 106.

After the learning object has been provided to the student, the process 900 proceeds to block 910 wherein an indication of the completion of the remediation learning object is received. In some embodiments, the indication of the completion of the remediation learning object is received via the user interface 208 of the user device 106. In some embodiments, and as discussed above with respect to block 816 of FIG. 8, this indication can comprise student inputs provided in response to a prompt of one or several content objects of the learning object including, for example, one or several assessment objects.

After the indication of the completion of the remediation learning object is received, the process 900 proceeds to block 912 wherein the level of student success in completion of the remediation learning object is evaluated. In some embodiments, the student success can be evaluated by comparing the indication of the completion of the remediation learning object to answer data stored within one of the databases 104 such as, for example, the object database 104-A. In some embodiments, score can be generated based on the number of questions that the student correctly answered and/or the level of accuracy provided by the student in response to the prompts of the assessment object.

After the success of the student has been evaluated, the process proceeds to block 914 wherein the student context is updated. In some embodiments, for example, the student context can be updated according to the process depicted in block 710 through 734 of FIG. 7. In some embodiments, the updated student context can further include the update of the vector context associated with the learning object. After the student context has been updated, the process 900 proceeds to block 916 and continues with block 730 of FIG. 7.

Returning again to decision state 902, if it is determined that there is not an identifiable failure reason, then the process 900 proceeds to block 918 wherein the current failure of the student in traversing the learning vector and in completing the learning object is compared to failure data. In some embodiments, this failure data can be retrieved from one of the databases 104 such as, for example, the object database 104-A. In some embodiments, the failure data can comprise an identification of student contexts of students that failed to successfully traverse the learning vector and complete the learning object. In some embodiments, the comparison of the failure of the student in traversing the current learning vector to the failure data can include retrieving a failure data from one of the databases 104, and specifically from the object database 104-A. in some embodiments, the comparison of the failure data to the current failure of the student to traverse the learning vector can include the identification of any common traits and/or attributes of the student context of the student that currently failed to traverse the learning vector with the student contexts of students who previously failed to traverse the learning vector.

After information relating to the current student failure to traverse the learning vector has been compared with failure data, the process 900 proceeds to decision state 920 wherein it is determined if similar failures are identified within failure data. In some embodiments, the similar failures can be identified based on commonalities between the student context of students who previously failed to traverse the learning vector and the student context of the student who currently failed to traverse the learning vector. In some embodiments, the determination can be made according to a Boolean function wherein a first value is associated with the experience data of the student who currently failed to traverse the learning vector if that student shares commonalities with students who previously failed to successfully traverse the learning vector, and wherein a second value is associated with the experience data of the student who currently failed to traverse the learning vector if that student does not share commonalities with students who previously failed to traverse the learning vector.

If it is determined that the student who currently failed to traverse the learning vector shares commonalities with students that previously failed to successfully traverse the learning vector, then the process 900 proceeds to block 922 and the remediation route is identified. In some embodiments, the remediation route can comprise one or several learning objects that were used to remedy the failure of students who previously failed to traverse the learning vector. After the remediation route is identified, the process 900 proceeds to block 906 and continues as outlined above.

Returning to decision state 920, if it is determined that the student who currently failed to traverse the learning vector does not share commonalities with students who previously failed to successfully traverse the learning vector, the process 900 proceeds to block 924 wherein intervention is requested. In some embodiments, the intervention can comprise an intervention request that can include associating a value indicative of the request for intervention with the student experience information and adding the value indicative of the request for intervention to one of the databases 104 such as, for example, the student database 104-E. After the value indicative of the request for intervention has been associated with the student experience data, a request for information can be provided to the user via the user device 106. After the request for intervention estimate, the process 900 proceeds block 918 continues with block 730 of FIG. 7.

Figure 10:
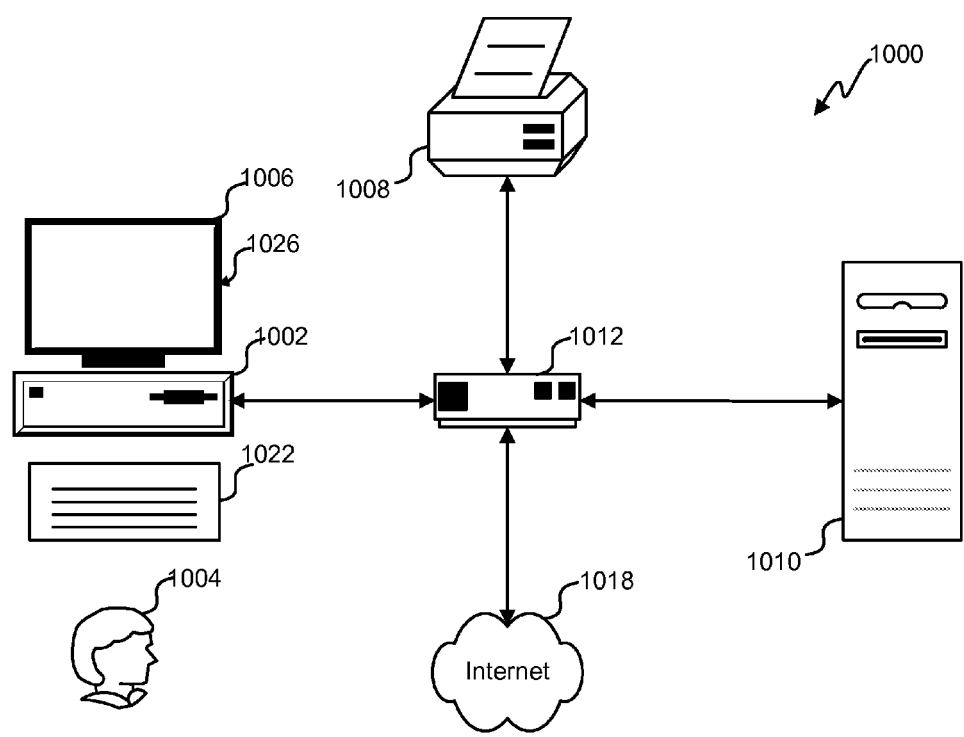
FIG. 10 is a schematic illustration of one embodiment of the computer system.

With reference now to FIG. 10, an exemplary environment with which embodiments may be implemented is shown with a computer system 1000 that can be used by a user 1004 as all or a component of the learning system 100. The computer system 1000 can include a computer 1002, keyboard 1022, a network router 1012, a printer 1008, and a monitor 1006. The monitor 1006, processor 1002 and keyboard 1022 are part of a computer system 1026, which can be a laptop computer, desktop computer, handheld computer, mainframe computer, etc. The monitor 1006 can be a CRT, flat screen, etc.

A user 1004 can input commands into the computer 1002 using various input devices, such as a mouse, keyboard 1022, track ball, touch screen, etc. If the computer system 1000 comprises a mainframe, a designer 1004 can access the computer 1002 using, for example, a terminal or terminal interface. Additionally, the computer system 1026 may be connected to a printer 1008 and a server 1010 using a network router 1012, which may connect to the Internet 1018 or a WAN.

The server 1010 may, for example, be used to store additional software programs and data. In one embodiment, software implementing the systems and methods described herein can be stored on a storage medium in the server 1010. Thus, the software can be run from the storage medium in the server 1010. In another embodiment, software implementing the systems and methods described herein can be stored on a storage medium in the computer 1002. Thus, the software can be run from the storage medium in the computer system 1026. Therefore, in this embodiment, the software can be used whether or not computer 1002 is connected to network router 1012. Printer 1008 may be connected directly to computer 1002, in which case, the computer system 1026 can print whether or not it is connected to network router 1012.

Figure 11:
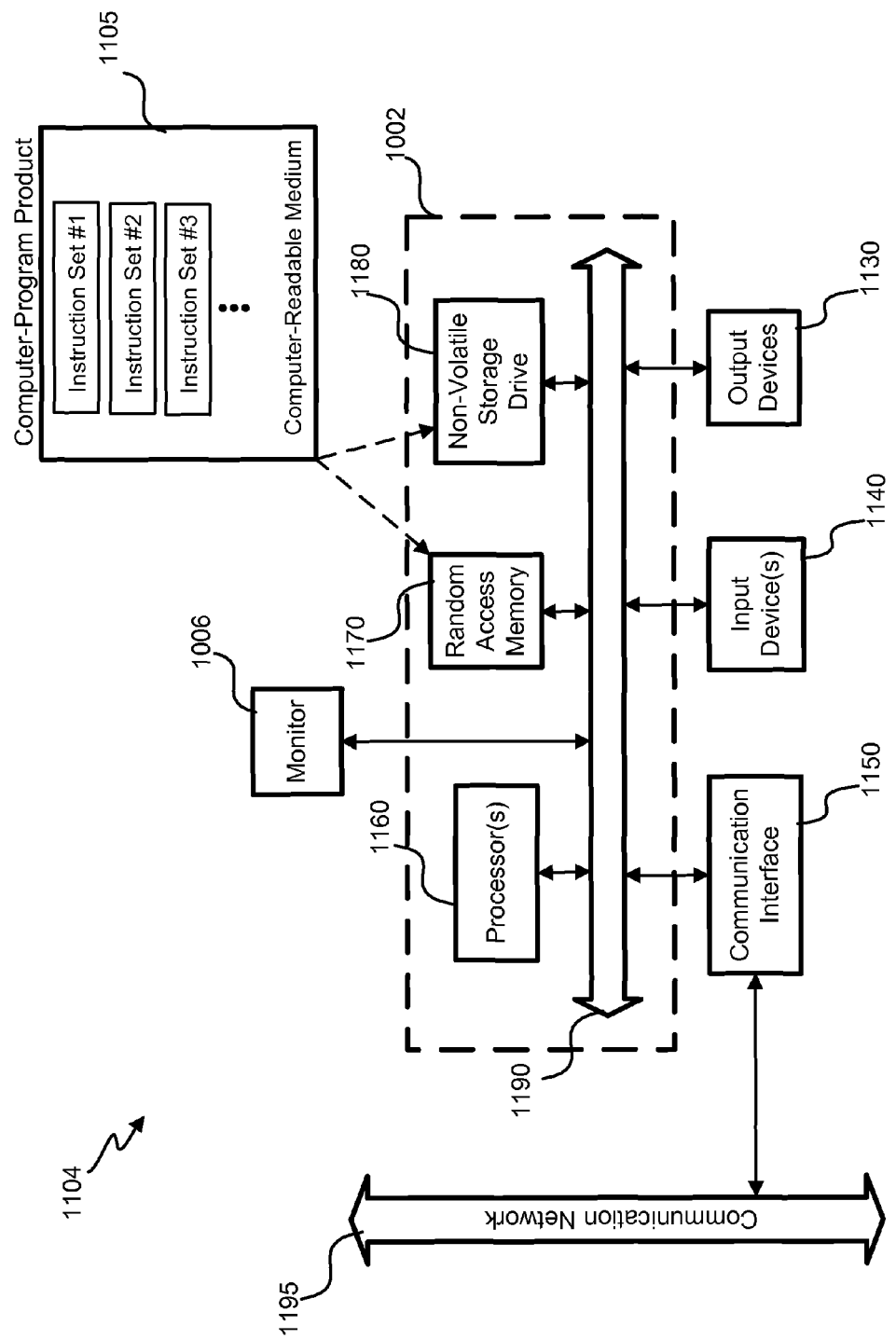
FIG. 11 is a schematic illustration of one embodiment of a special-purpose computer system.

With reference to FIG. 11, an embodiment of a special-purpose computer system 1104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1026, it is transformed into the special-purpose computer system 1104.

Special-purpose computer system 1104 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1104 to perform the above-described methods. Computer 1002 may include one or more processors 1160 that communicate with a number of peripheral devices via a bus subsystem 1190. These peripheral devices may include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 may be stored in non-volatile storage drive 1180 or another computer-readable medium accessible to computer 1002 and loaded into memory 1170. Each processor 1160 may comprise a microprocessor, such as a microprocessor from Intel® or Advanced Micro Devices, Inc.®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft® Corporation, Solaris® from Oracle®, LINUX, UNIX, and the like.

User input devices 1140 include all possible types of devices and mechanisms to input information to computer system 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These may include a display (e.g., monitor 1006), printers, non-visual displays such as audio output devices, etc.

Communications interface 1150 provides an interface to other communication networks 1195 and devices and may serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 may be coupled to a computer network, to a FireWire® bus, or the like. In other embodiments, communications interface 1150 may be physically integrated on the motherboard of computer 1002, and/or may be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 may be configured to store the basic programming and data constructs that provide the functionality of various embodiments of the present invention, as described above.

Software instruction sets that provide the functionality of the present invention may be stored in RAM 1170 and non-volatile storage drive 1180. These instruction sets or code may be executed by the processor(s) 1160. RAM 1170 and non-volatile storage drive 1180 may also provide a repository to store data and data structures used in accordance with the present invention. RAM 1170 and non-volatile storage drive 1180 may include a number of memories including a main random access memory (RAM) to store of instructions and data during program execution and a read-only memory (ROM) in which fixed instructions are stored. RAM 1170 and non-volatile storage drive 1180 may include a file storage subsystem providing persistent (non-volatile) storage of program and/or data files. RAM 1170 and non-volatile storage drive 1180 may also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem may utilize multiple busses or communication paths within the computer 1002.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of recommending a path comprising learning objects and learning vectors, the method comprising:
  automatically generating a learning object network, wherein generating the learning object network comprises:
    automatically receiving a plurality content objects from a plurality of data sources via a network at a processor, wherein each of the learning objects comprises an aggregation of learning content that is associated with an assessment;
    automatically generating a plurality of learning vectors connecting the plurality of content objects with the processor based on information received from a plurality of user devices, wherein each of the plurality of learning vectors connects two of the plurality of learning objects and identifies a prerequisite relationship between the connected two of the plurality of learning objects, wherein each of the plurality of learning vectors comprises a direction identifying the prerequisite relationship and a magnitude; and
    continuously updating the plurality of learning vectors based on signals received from one or several user devices identifying successes and failures in traversing the plurality of learning vectors;
  receiving at the processor an input from a student device via the network;
  automatically identifying a student user of the student device based on the received input and information retrieved from a student database;
  automatically retrieving information relating to a plurality of learning object networks;
  automatically identifying with the processor one of the plurality of learning object networks relevant to the student user of the student device;
  automatically identifying with a processor an incident learning object, wherein the incident learning object comprises an initial position of a student within the learning object network,
    wherein the incident learning object is identified by one of:
      a user input identifying the incident learning object, wherein the user comprises one of a teacher and the student user of the student device; and
      a student context, wherein the student context comprises the:
        student's learning history; and
        metadata identifying a student learning capability;
  automatically identifying with the processor a target learning object, wherein the target learning object is a learning object separated from the incident learning object by a plurality of learning vectors;
  automatically identifying with the processor a first path from the incident learning object to the target learning object, wherein the first path comprises a plurality of learning objects and a plurality of learning vectors connecting the incident learning object to the target learning object;
  automatically calculating with the processor the magnitude of the first path from the incident learning object to the target learning object, wherein calculating the magnitude of the first path from the incident learning object to the target learning object comprises:
    automatically varying the magnitudes of the plurality of learning vectors in the first and second path based on the student context;
    retrieving the magnitudes of the plurality of learning vectors in the first path; and
    calculating a combined magnitude of the first path;
  wherein retrieving the magnitudes of the plurality of learning vectors in the first path comprises:
    identifying a characteristic of the student, wherein the student characteristic is identified via a user input or via the student context;
    retrieving a learning vector context, wherein the learning vector context identifies magnitude data corresponding to aspects of the student context; and
    identifying magnitude data corresponding to the identified characteristic of the student;
  automatically identifying with the processor a second path from the incident learning object to the target learning object, wherein the second path comprises a plurality of learning objects and learning vectors connecting the incident learning object to the target learning object, wherein the second path comprises at least one learning object that is not in the first path automatically calculating with the processor the magnitude of the second path from the incident learning object to the target learning object;

automatically comparing with the processor the magnitude of the first path to the magnitude of the second path;

automatically providing one of the plurality of learning objects from the one of the first and second paths having the lesser magnitude to the student device, wherein the student device is remove from the processor;

receiving an indicator of completion of the provided learning object; and automatically generating and sending a communication to the student device, wherein the communication comprises an enhancement object automatically triggered for providing to the student via a threshold, wherein the enhancement object is outside of the one of the first and second learning paths containing the provided learning object, and wherein the communication activates a user interface of the student device to provide the enhancement object to the user via a screen of the student device.

2. The method of claim 1, wherein the student characteristic comprises one of: a learning style; a student's past performance; and a student preference.

3. The method of claim 1, wherein calculating the combined magnitude of the first path comprises calculating the sum of the magnitudes of the plurality of learning vectors in the first path.

4. The method of claim 1, wherein calculating the magnitude of the second path from the incident learning object to the target learning object comprises:

retrieving the magnitudes of the plurality of learning vectors in the second path; and calculating a combined magnitude of the second path.

5. The method of claim 4, wherein calculating the combined magnitude of the second path comprises calculating the sum of the magnitudes of the plurality of learning vectors in the second path.

6. The method of claim 1, wherein comparing the magnitude of the first path to the magnitude of the second path comprises:

retrieving the magnitude of the first path;
retrieving the magnitude of the second path;
comparing the value of the magnitude of the first path to the magnitude of the second path;
adding a first binary-value to the learning path having a smaller combined magnitude and a second binary-value to the learning path having a larger combined magnitude;
retrieving the learning path associated with the first value; and
providing the learning path associated with the first value.

7. The method of claim 1, wherein the magnitude of the first path comprises a measure of the estimated duration of the traversal of the first path and wherein the magnitude of the second path comprises a measure of the estimated duration of the traversal of the second path.

8. The method of claim 1, further comprising:
calculating a first strength of the first learning path, wherein the first strength identifies the degree to which students have successfully traversed the first learning path;
calculating a second strength of the second learning path, wherein the second strength identifies the degree to which students have successfully traversed the second learning path;
comparing the first strength to the second strength; and
selecting one of the first and second paths based on the comparison of the first and second strengths and the magnitudes of the first and second learning paths.

9. A system for recommending a path comprising learning objects and learning vectors, the system comprising:
memory comprising:
information identifying a number of learning objects, wherein each of the learning objects comprises an aggregation of learning content that is associated with an assessment;
information identifying a number of learning vectors wherein each of the learning vectors connects two of the learning objects and identifies a prerequisite relationship between the connected two of the learning objects, wherein each of the learning vectors comprises a direction identifying the prerequisite relationship and a magnitude; and
a student context wherein the student context comprises the:
student's learning history; and
metadata identifying a student learning capability; and
a processor configured to:
automatically generate a learning object network, wherein generating the learning object network comprises:
automatically receiving a plurality content objects from a plurality of data sources via a communication network, wherein each of the learning objects comprises an aggregation of learning content that is associated with an assessment;
automatically generating a plurality of learning vectors connecting the plurality of content objects with the processor based on information received from a plurality of user devices, wherein each of the plurality of learning vectors connects two of the plurality of learning objects and identifies a prerequisite relationship between the connected two of the plurality of learning objects, wherein each of the plurality of learning vectors comprises a direction identifying the prerequisite relationship and a magnitude; and
continuously updating the plurality of learning vectors based on signals received from one or several user devices identifying successes and failures in traversing the plurality of learning vectors;
receive an input from a student device;
automatically identify a student user of the student device based on the received input and information retrieved from a student database;
automatically retrieve information relating to a plurality of learning object networks;
automatically identify with the processor one of the plurality of learning object networks relevant to the student user of the student device;
automatically identify an incident learning object, wherein the incident learning object comprises an initial position of the student within the learning object network,
wherein the incident learning object is identified by one of:
a user input identifying the incident learning object, wherein the user comprises one of a teacher and the student; and
the student context;

automatically identify a target learning object, wherein the target learning object is a learning object separated from the incident learning object by a plurality of learning vectors;
automatically identify a first path from the incident learning object to the target learning object, wherein the first path comprises a plurality of learning objects and a plurality learning vectors connecting the incident learning object to the target learning object;
automatically calculate the magnitude of the first path from the incident learning object to the target learning object, wherein calculating the magnitude of the first path from the incident learning object to the target learning object comprises:
automatically varying the magnitudes of the plurality of learning vectors in the first and second path based on the student context;
retrieving the magnitudes of the plurality of learning vectors in the first path; and
calculating a combined magnitude of the first path;
wherein retrieving the magnitudes of the plurality of learning vectors in the first path comprises:
identifying a characteristic of the student, wherein the student characteristic is identified via a user input or via the student context;
retrieving a learning vector context, wherein the learning vector context identifies magnitude data corresponding to aspects of the student context;
and
identifying magnitude data corresponding to the identified characteristic of the student;
automatically identify a second path from the incident learning object to the target learning object, wherein the second path comprises a plurality of learning objects and learning vectors connecting the incident learning object to the target learning object, wherein the second path comprises at least one learning object that is not in the first path;
automatically calculate the magnitude of the second path from the incident learning object to the target learning object;
automatically compare the magnitude of the first path to the magnitude of the second path;
automatically provide one of the plurality of learning objects from one of the first and second paths having a lesser magnitude to the student device, wherein the student device is remove from the processor; and
receive an indicator of completion of the provided learning object; and
automatically generate and send a communication to the student device, wherein the communication comprises an enhancement object automatically triggered for providing to the student via a threshold, wherein the enhancement object is outside of the one of the first and second learning paths containing the provided learning object, and
wherein the communication activates a user interface of the student device to provide the enhancement object to the user via a screen of the student device.

10. The system of claim 9, wherein calculating the combined magnitude of the first path comprises calculating the sum of the magnitudes of the plurality of learning vectors in the first path.

11. The system of claim 10, wherein comparing the magnitude of the first path to the magnitude of the second path comprises:
retrieving the magnitude of the first path;
retrieving the magnitude of the second path;
comparing the value of the magnitude of the first path to the magnitude of the second path;
adding a first Boolean-value to the learning path having a smaller combined magnitude and a second Boolean-value to the learning path having a larger combined magnitude;
retrieving the learning path associated with the first value; and
providing the learning path associated with the first value.

12. The system of claim 9, wherein the magnitude of the first path comprises a measure of the estimated duration of the traversal of the first path and wherein the magnitude of the second path comprises a measure of the estimated duration of the traversal of the second path.

13. The system of claim 9, wherein the processor is further configured to:
calculate a first strength of the first learning path, wherein the first strength identifies the degree to which students have successfully traversed the first learning path;
calculate a second strength of the second learning path, wherein the second strength identifies the degree to which students have successfully traversed the second learning path;
compare the first strength to the second strength; and
select one of the first and second paths based on the comparison of the first and second strengths and the magnitudes of the first and second learning paths.

* * * * *